(12) United States Patent
Skliar et al.

(10) Patent No.: US 12,253,448 B2
(45) Date of Patent: Mar. 18, 2025

(54) ISOLATION, STORAGE, AND DELIVERY OF EXTRACELLULAR VESICLES USING ASYMMETRIC DEPTH FILTERS

(71) Applicant: UNIVERSITY OF UTAH RESEARCH FOUNDATION, Salt Lake City, UT (US)

(72) Inventors: Mikhail Skliar, Salt Lake City, UT (US); Vasiliy S. Chernyshev, Moscow (RU)

(73) Assignee: UNIVERSITY OF UTAH RESEARCH FOUNDATION, Salt Lake City, UT (US)

( * ) Notice: Subject to any disclaimer, the term of this patent is extended or adjusted under 35 U.S.C. 154(b) by 0 days.

(21) Appl. No.: 17/894,732

(22) Filed: Aug. 24, 2022

(65) Prior Publication Data

US 2023/0358650 A1    Nov. 9, 2023

Related U.S. Application Data

(60) Provisional application No. 63/337,959, filed on May 3, 2022.

(51) Int. Cl.
*G01N 1/40* (2006.01)
(52) U.S. Cl.
CPC ... *G01N 1/4005* (2013.01); *G01N 2001/4088* (2013.01)
(58) Field of Classification Search
CPC ...... G01N 1/30; G01N 1/4005; G01N 1/4077; G01N 2001/4088; C12Q 1/68
See application file for complete search history.

(56) References Cited

U.S. PATENT DOCUMENTS 5,944,998 A * 8/1999 Rolchigo ............. B01D 29/118
                                               210/256
9,968,931 B2   5/2018 Zhang et al.
(Continued)

FOREIGN PATENT DOCUMENTS

| WO | 2019/132688 A1 | 7/2019 |
| WO | 2021/055338 A1 | 3/2021 |
| WO | 2022/251314 A1 | 12/2022 |

OTHER PUBLICATIONS

Zhang et al "Improving Isolation of Extracellular Vesicles by Utilizing Nanomaterials". Membranes, 12,55. https://doi.org/ 10.3390/ membranes12010055 (Year: 2021).*

(Continued)

*Primary Examiner* — Jennifer Wecker
*Assistant Examiner* — Jonathan Bortoli
(74) *Attorney, Agent, or Firm* — Workman Nydegger

(57) ABSTRACT

Asymmetric depth filtration for isolation of EVs or other desired nanoparticles from a biological or other fluid with high yield and purity in a simple, cost-effective manner. Such a method includes passing the biological fluid through the asymmetric depth filter (e.g., in a single pass) where the fluid is introduced into the filter at an entry portion, where components of the biological fluid pass through the wider entry portion of the pores before advancing towards the narrower exit portion of the pores, wherein EVs in the fluid become reversibly entrapped within the wider portion of the pores, while similarly sized soft, low-density lipids and/or proteins are pushed more deeply into the filter, so that the reversibly entrapped EVs can be released by simply reversing the flow, while the similarly sized soft low-density lipids and/or proteins remain permanently entrapped within the pores of the filter.

16 Claims, 19 Drawing Sheets

(56) References Cited

U.S. PATENT DOCUMENTS

| | | | |
|---|---|---|---|
| 10,222,313 | B2 | 3/2019 | Reichenbach |
| 10,585,022 | B2 | 3/2020 | Kwak et al. |
| 2010/0240543 | A1* | 9/2010 | Liotta .............. G01N 33/54346 435/6.12 |
| 2020/0330922 | A1* | 10/2020 | Keshelava ........... B01D 63/087 |
| 2022/0026323 | A1 | 1/2022 | Yasui et al. |
| 2022/0347686 | A1* | 11/2022 | Wang ................ B01L 3/502753 |
| 2023/0158483 | A1* | 5/2023 | Higaki .................... B01J 47/12 502/4 |

OTHER PUBLICATIONS

Chernyshev et al ("Asymmetric depth-filtration—a versatile and scalable approach for isolation and purification of extracellular vesicles") Article in Biotechnology State of the Art and Perspectives • Jan. 2021 DOI: 10.37747/2312-640X-2021-19-55-56.*

Konoshenko ("Isolation of Extracellular Vesicles: General Methodologies and Latest Trends") Hindawi BioMed Research International vol. 2018, Article ID 8545347, 27 pages https://doi.org/10.1155/2018/8545347 (Year: 2018).*

Evtushenko et al., "Adsorption of extracellular vesicles onto the tube walls during storage in solution," PloS one, vol. 15, Issue 12, 2020, e0243738, pp. 16.

Zhang et al. "Asymmetric-flow field-flow fractionation technology for exomere and small extracellular vesicle separation and characterization." Nature protocols, vol. 14, Issue 4, 2019, pp. 1027-1053.

* cited by examiner

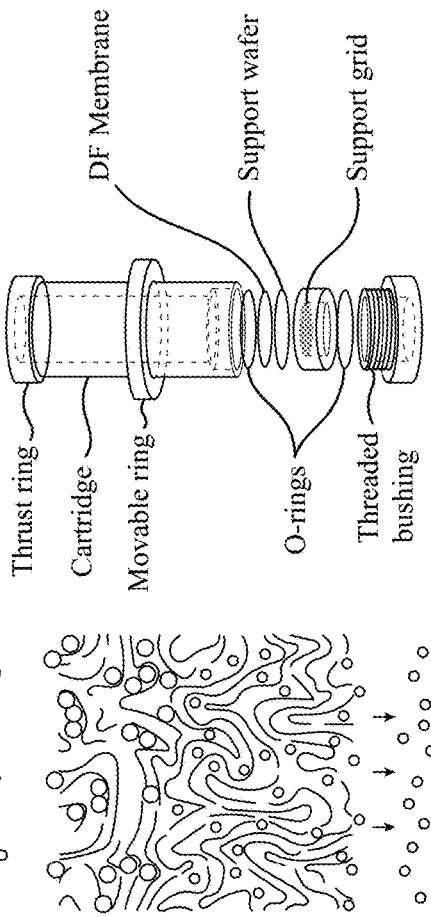

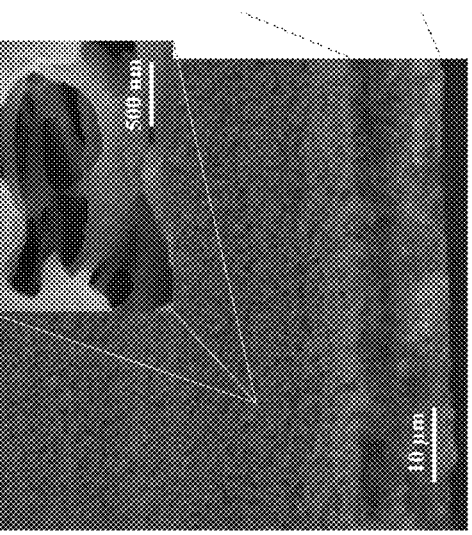

FIG. 1C

Thrust ring
Cartridge
Movable ring
O-rings
DF Membrane
Support wafer
Support grid
Threaded bushing

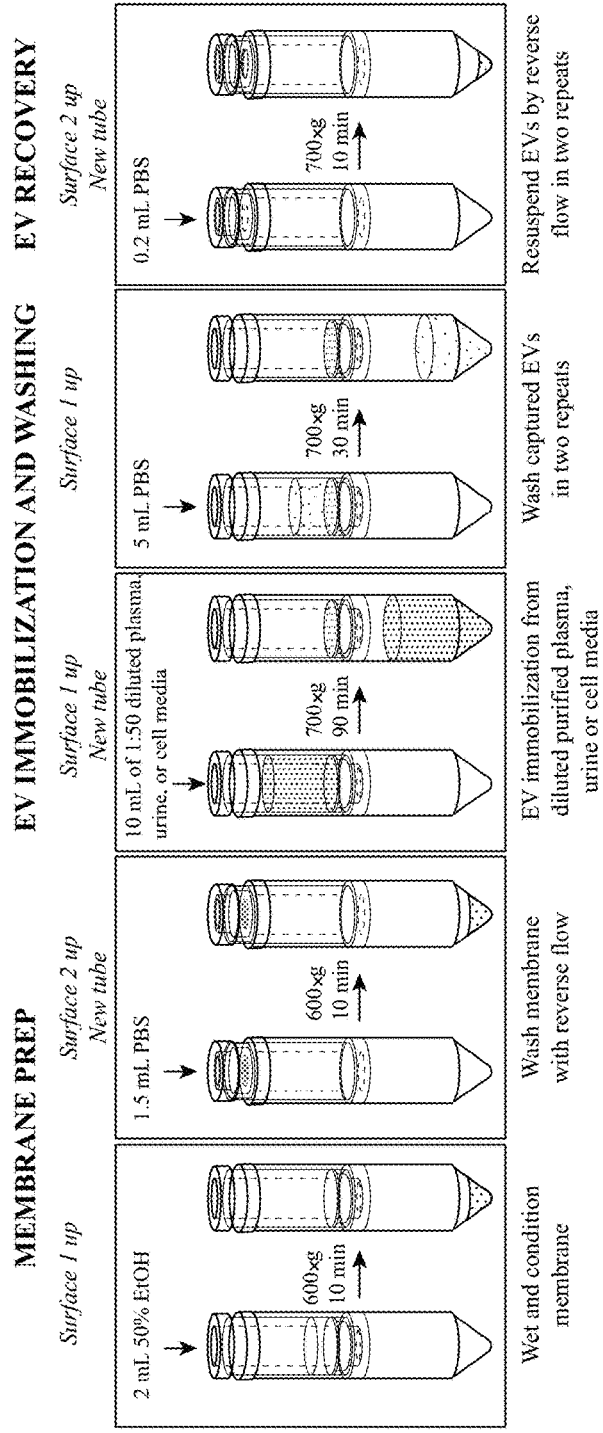

FIG. 1D

MEMBRANE PREP

Surface 1 up
2 mL 50% EtOH
600×g 10 min
Wet and condition membrane

Surface 2 up
New tube
1.5 mL PBS
600×g 10 min
Wash membrane with reverse flow

EV IMMOBILIZATION AND WASHING

Surface 1 up
New tube
10 mL of 1:50 diluted plasma, urine, or cell media
700×g 90 min
EV immobilization from diluted purified plasma, urine or cell media Surface 1 up
5 mL PBS
700×g 30 min
Wash captured EVs in two repeats

EV RECOVERY

Surface 2 up
New tube
0.2 mL PBS
700×g 10 min
Resuspend EVs by reverse flow in two repeats

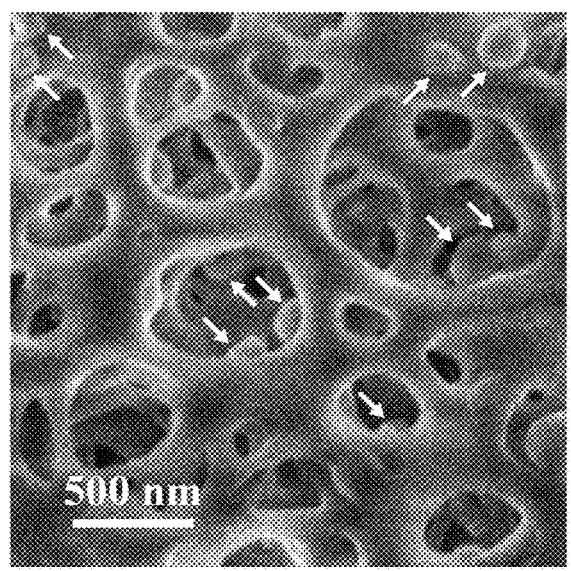
FIG. 3A
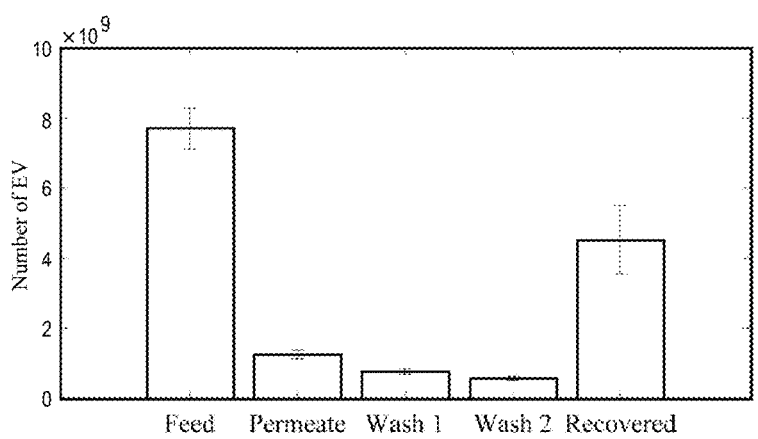
FIG. 3B
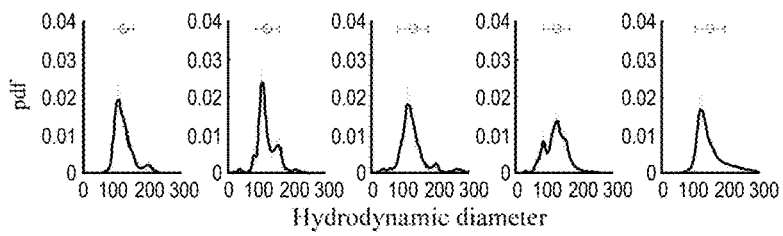
FIG. 3C
FIG. 3D 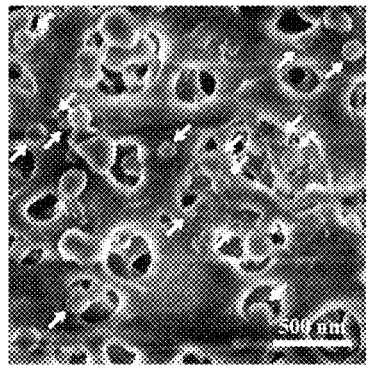 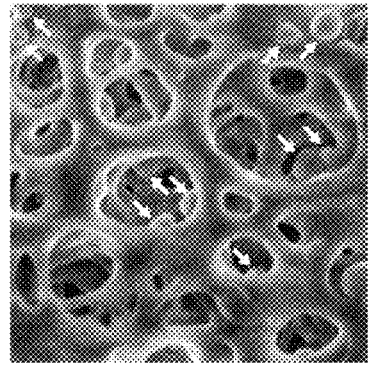 FIG. 3E

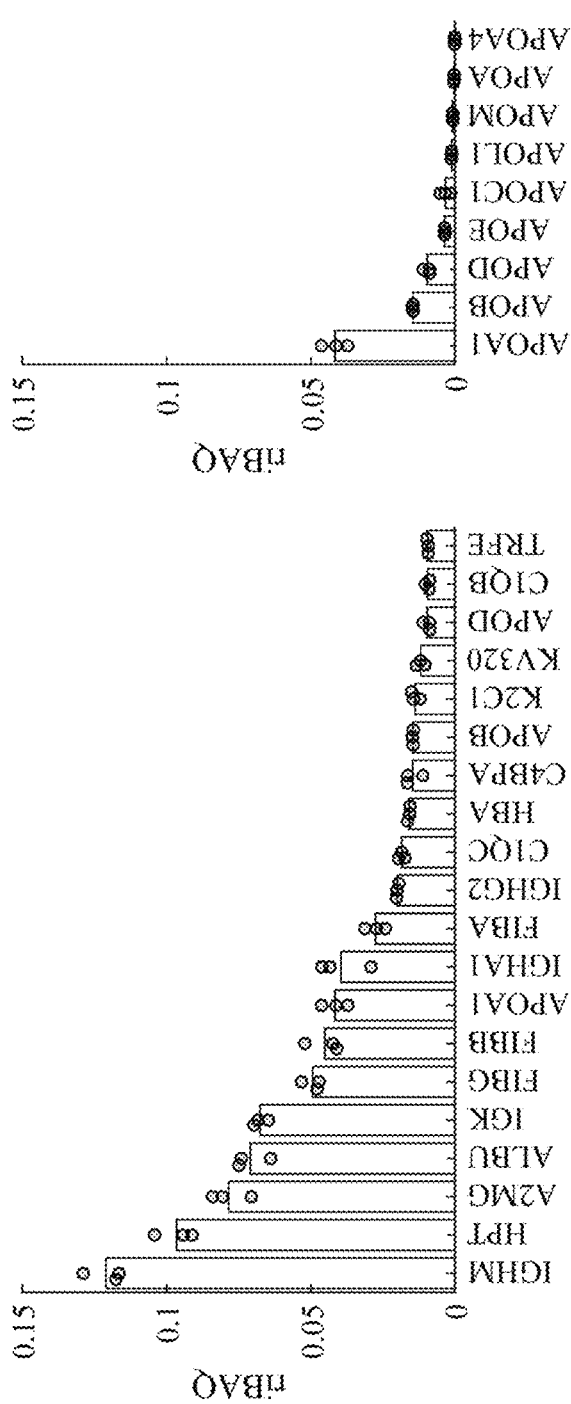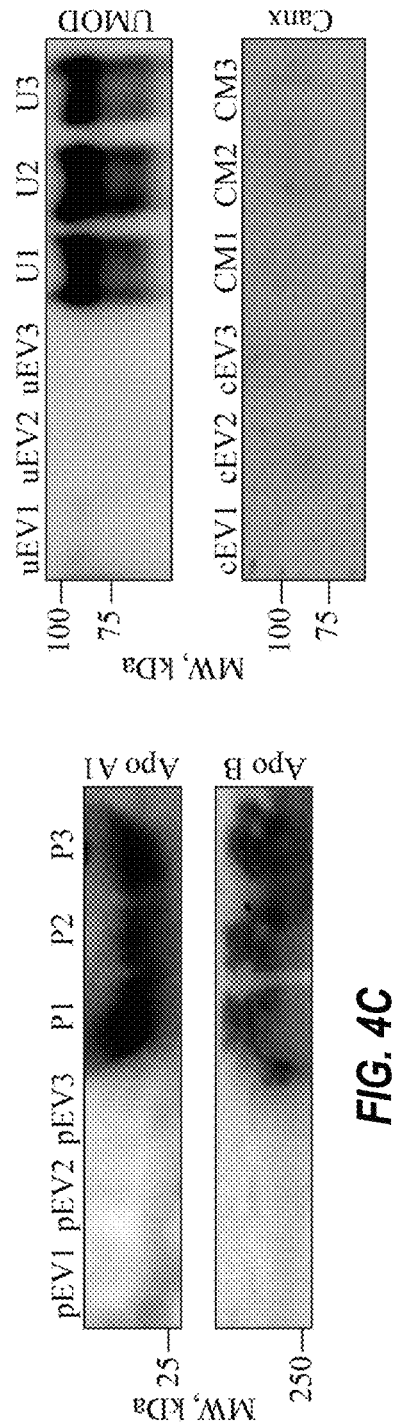

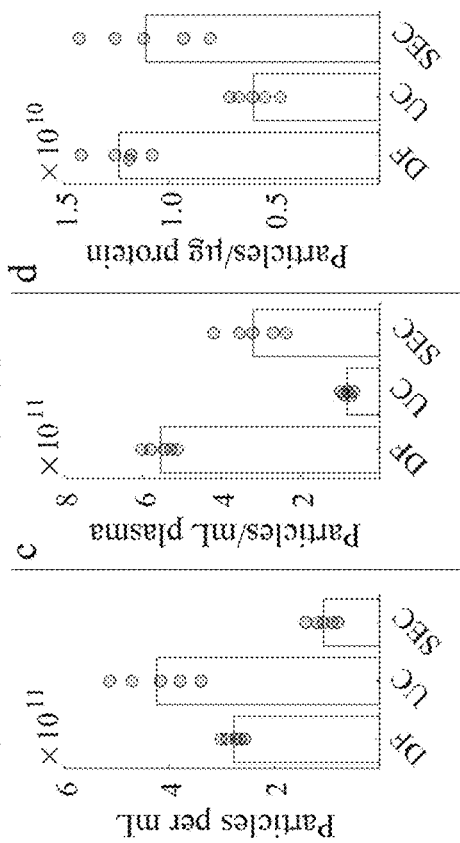
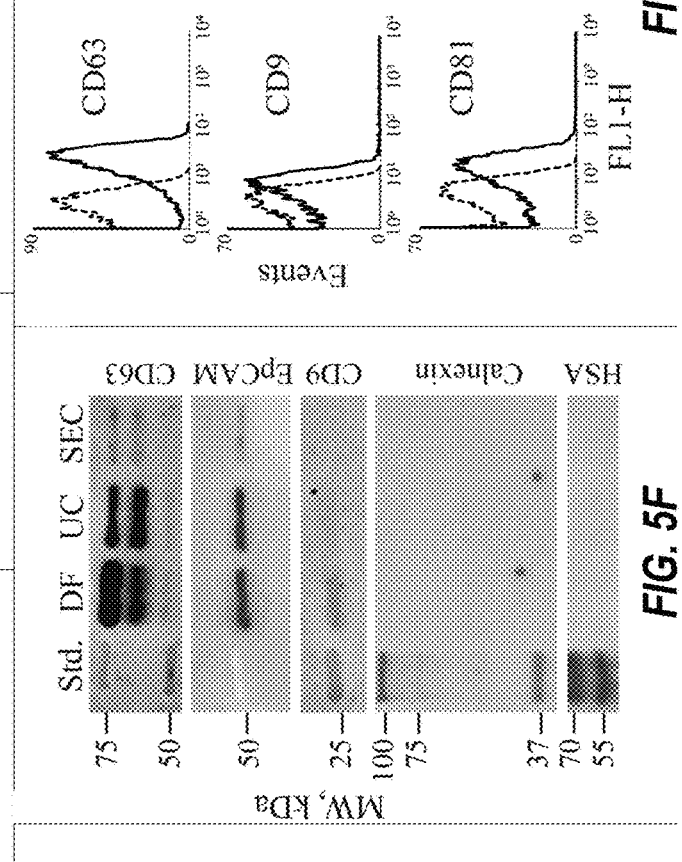
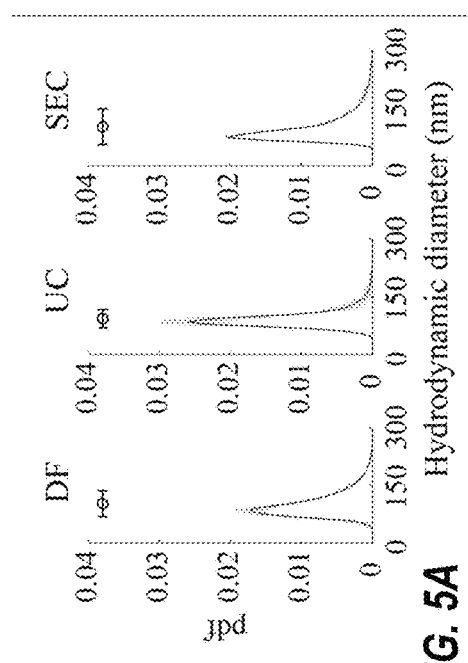
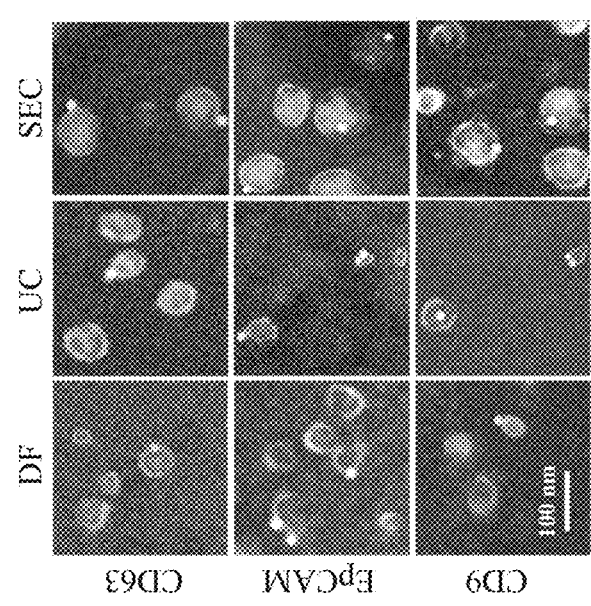

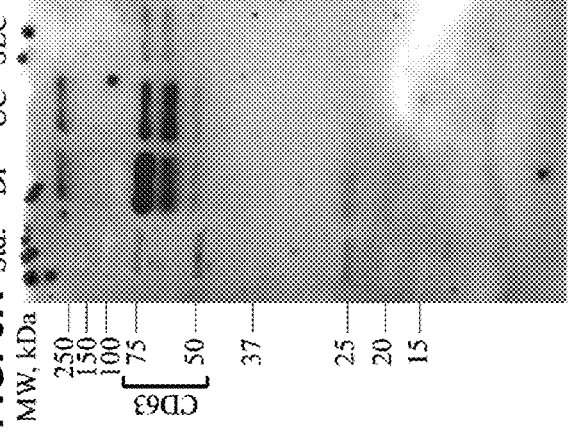
FIG. 5P
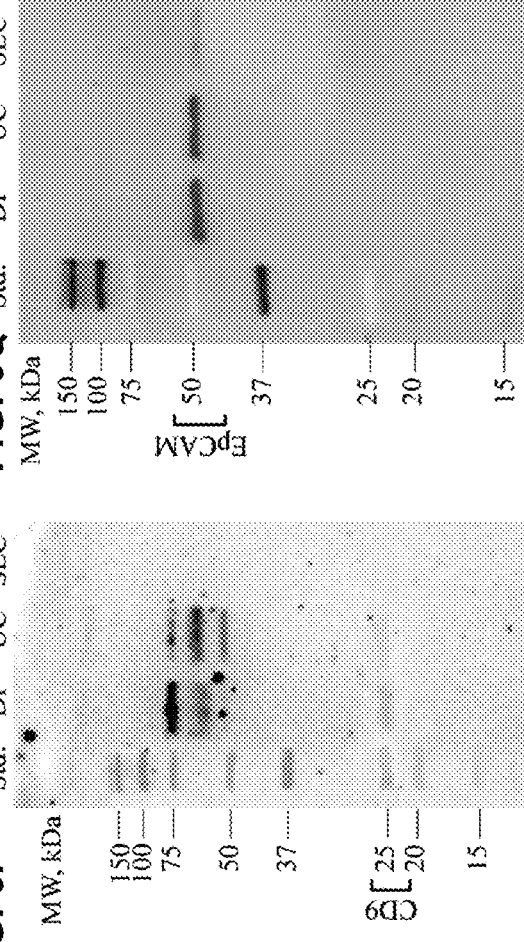
FIG. 5Q
FIG. 5R
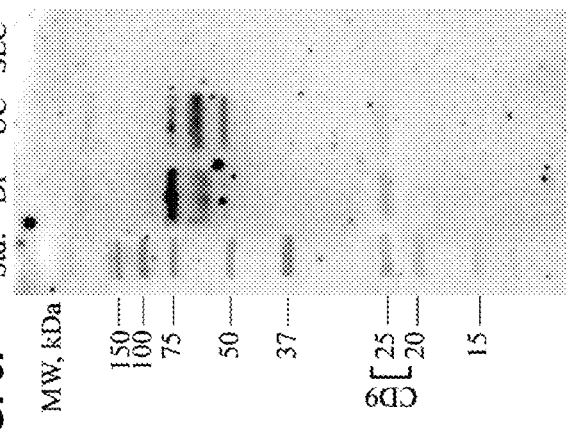
FIG. 5S
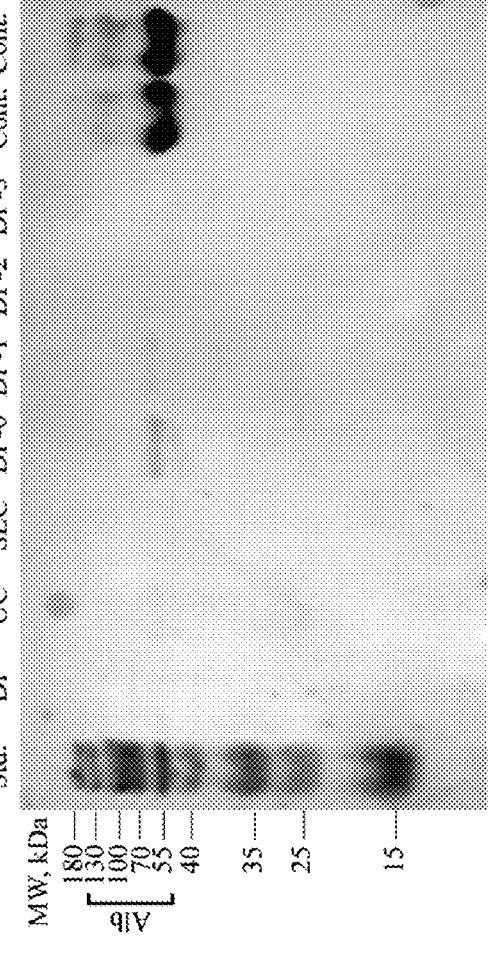
FIG. 5T

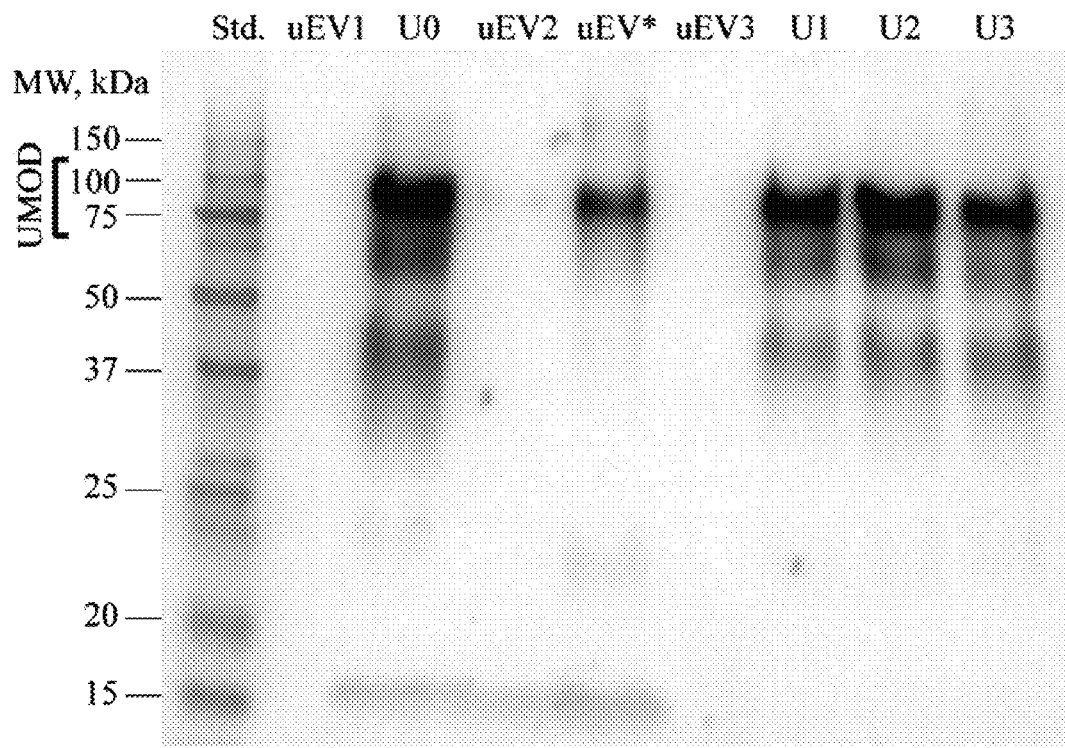
FIG. 5U
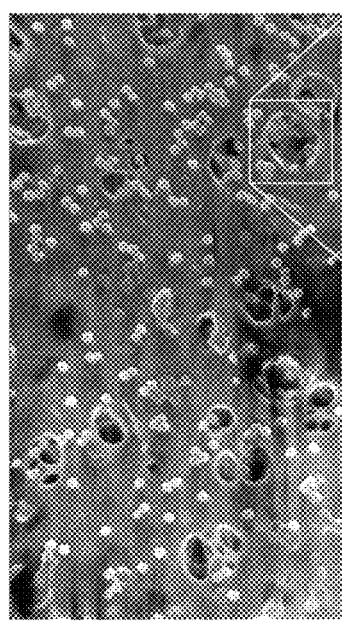 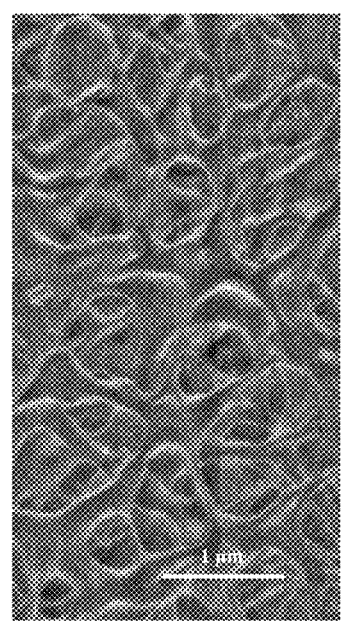
FIG. 6A  FIG. 6B

ISOLATION, STORAGE, AND DELIVERY OF EXTRACELLULAR VESICLES USING ASYMMETRIC DEPTH FILTERS

CROSS-REFERENCE TO RELATED APPLICATIONS

The present application claims the benefit of U.S. Provisional Patent Application No. 63/337,959 filed May 3, 2022 and entitled ISOLATION, STORAGE, AND DELIVERY OF EXTRACELLULAR VESICLES USING ASYMMETRIC DEPTH FILTERS, which is herein incorporated by reference in its entirety. The inventors' publication, Chernyshev et al., Asymmetric depth-filtration: A versatile and scalable method for high-yield isolation of extracellular vesicles with low contamination, J. of Extracellular Vesicles, Vol. 11, Issue 8, (August 2022), including the supplemental materials thereto, is also herein incorporated by reference in its entirety.

FIELD OF THE INVENTION

The present invention generally relates to systems and methods for isolation of extracellular vesicles (EVs).

BACKGROUND

Isolation of EVs from complex biofluids, such as plasma, urine, saliva, amniotic fluid, and growth medium of cultured cells is challenging. EV isolations are often contaminated by a complex biomolecular milieu of biofluids, including lipid nanoparticles and protein agglomerates, which overlap with EVs in size and other biophysical properties, making separation very difficult.

The yield of EVs isolated from such fluids varies significantly by isolation method. In blood and plasma, lipid particles are present at higher concentrations than EVs and contribute considerably to contamination, even when methods purposefully designed to eliminate them are employed. For example, a recently developed elaborate precipitation-purification sequence (Zhang et al., 2020) depletes lipid particles in EV isolations down to an impressive 10%. This nevertheless represents significant contamination, and requires complex methodology. The contamination by solubilized proteins is similarly variable, e.g., reported to be a microgram of proteins per $10^7$ to $10^{11}$ EVs, depending on the applied isolation method.

Most isolation protocols involve a trade-off between unbiased high-yield isolation of all EVs present in a biofluid versus purity of isolated EVs. At one extreme, precipitation techniques effectively pull essentially all biological nanoparticles out of the biofluid, but at the cost of significant contamination, as such EVs are by co-precipitated with significant non-EV content. At the other end of the spectrum, immuno-affinity capture isolates high purity EVs but extracts only a minority subpopulation of vesicles that express the capture biomarker, leaving the majority of EVs behind. While a sample's purity is of very high importance, biased and fractionated isolations, even when pure, are problematic as they may not adequately represent the multifactorial and multifaceted biological activity of the entire heterogeneous population of EVs originally present in the sample. Other isolation methods, including ultracentrifugation, size-exclusion chromatography, filtration, field-flow fractionation, and combinations of such methods are similarly limited as they attempt to balance the difficult task of maximizing EV yield while minimizing cross contamination. Multistep, complex sequences that include dedicated purification procedures are thought to be required to isolate EVs with high yield and purity.

As such, there is a continuing need for improved systems and procedures. It would be particularly advantageous if a relatively simple system and method could allow for the isolation of EVs with high purity and high yield. Integrating the EV isolation with short-term and long-term storage of obtained EV preparations and their therapeutic delivery into a single technological platform is also desirable.

SUMMARY

The present disclosure is directed at using asymmetric depth filtration to isolate EVs or other desired nanoparticles from a biological fluid with high yield and high purity. In some implementations, the disclosed isolation platform may store the isolated nanoparticles for the short or long term and deliver them to a therapeutic site topically or after implantation. Such systems and methods are simple, fast, easy to use, and inexpensive, requiring only standard laboratory equipment, making such systems and methods suitable for low resource and point-of-use locations. Such methods may be used for EV isolation from small biological samples in diagnostic and treatment guidance applications and in scaled-up applications for harvesting therapeutic EVs from large volumes of cell culture medium. Such methods and systems may also be applied to isolate nanoparticles from biological fluids other than EVs. Examples include but are not limited to viruses, lipid particles (such as HDL and LDL), protein agglomerates, therapeutic and vaccine formulations that use nanoparticles to deliver therapeutics, such as COVID vaccines that use liposomes to deliver mRNA.

In an embodiment, the present disclosure relates to a method for isolating EVs or other desired particles from a biological fluid in a single step, using a single pass of the biological fluid through an asymmetric depth filter, the method including providing the biological fluid including EVs, providing the asymmetric depth filter, where the filter has asymmetric pores, where the pores are wider at the entrance portion of the asymmetric depth filter, and narrower at the exit portion of the asymmetric depth filter. The method includes passing the biological fluid through the asymmetric depth filter where the fluid is introduced into the filter at the entrance portion, so that components of the biological fluid pass through the wider entry portion of the pores before advancing towards the narrower exit portion of the pores, wherein EVs become reversibly entrapped within the wider (e.g., entry) section of the pores, while similarly sized soft, low-density lipids and/or proteins are pushed more deeply into the filter, so that the lightly and reversibly entrapped EVs can be released using a simple flow reversal technique, while the similarly sized soft low-density lipids and/or proteins remain permanently entrapped within the pores of the filter, even during flow reversal used to recover captured EVs. This allows broad, unbiased extraction of EVs, with high yield, and high purity, based simply on their size, while at the same time separating out similarly sized non desirable contaminant particles (e.g., lipids such as LDL particles, VLDL particles, and protein agglomerates) from the desirable EVs. The particles trapped by the filter may be washed with a washing buffer or other rinsing material and are recovered by reversing the flow of a resuspending buffer or other carrier. When storage of EVs is desired, the resuspension of EVs or other target nanoparticles may be delayed until the sample is needed. The storage conditions of isolated EVs may be in hydrated, dried, lyophilized, frozen, or other forms that prevent their degradation during storage until the recovery. In some embodiments, the entrapped EVs may not necessarily be released from the asymmetric depth filtration medium, e.g., a nanoparticle-infused filtration medium could be applied directly to a treatment site, such as a wound.

Such systems and methods allow for isolation, storage, and eventual delivery of high purity EVs, with high yield, in a simple, cost-effective manner.

In an embodiment, the asymmetric pores may be tortuous.

In an embodiment, the asymmetric pores may be conical.

Different pore segments, or portions of the asymmetric depth filtration medium may sometimes be referred to herein as "top" or "bottom", although it will be appreciated that such references are relative to the example illustrations provided (FIGS. 1a, 1d and 6c, for example). It will be apparent that the orientation may of course change in different implementations. For example, during centrifugation, the orientation is at an angle and may be horizontal when displacement or pressure-driven flows are used. It will be appreciated therefore, that where used, "top" refers to the pore's entry and "bottom" refers to the pore's exit during the isolation process.

In an embodiment, the top (entry) portion of the pores in the top (entry) surface of the depth filter may be characterized by pore sizes that are larger than the average size of the EVs being collected, where the pores narrow down in size, including instances when the exit pores are smaller than the size of EVs. The pores narrow but do not necessarily need to narrow to a size that is smaller than the size of nanoparticles they immobilize, as trapping may be kinetic—i.e., the longer flow occurs the more particles that will elute. In any case, this allows the EVs to collect within narrowing pores, becoming lightly entrapped within such pores, while the other materials within the sample proceed further into (or entirely through) such pores, either eluting out the bottom (exit) of the depth filter, or becoming permanently entrapped within such pores. By way of example, the pore openings at the entry surface may average greater than 100 nm in size, less than 1000 nm in size, less than 500 nm in size, less than 300 nm in size, or less than 200 nm in size (e.g., from 150 to 200 nm at the entry opening). The pores may narrow to less than 200 nm, less than 100 nm, less than 80 nm, less than 60 nm, less than 50 nm, such as about 10 nm to 50 nm, or 20 nm to 50 nm. Such sizes are merely exemplary. Of course, the selected pore sizes at entry and exit will depend on the size of the EVs or other particles to be captured, as well as the size of contaminant particles to be separated from the EVs or other particles (either by elution, or permanent entrapment).

In an embodiment, the depth filtration (DF) membrane may have a thickness from 1 μm to about 100 μm, from about 5 μm to about 50 μm, or from about 10 μm to about 30 μm. The rate of the pores' aperture reduction with the distance (or depth) from the pore entrance may be controlled by the thickness of the filter and the size of the entry and exit pores.

In an embodiment, the method may further include a sample preparation step, before depth filtration, e.g., particularly when isolating EVs obtained from blood plasma, or other fluids that may include particles that are significantly larger than the EVs to be isolated. For example, large plasma particles (larger than 0.8 μm) or similarly large particles can be removed before depth filtration through low-speed centrifugation followed by straining or surface filtration. For example, such preparation can use centrifugation and/or conventional filtration through a filter media having pores having a size through which the extracellular vesicles or other desired nanoparticles pass, but the larger than desired nanoparticles to be removed do not pass.

In an embodiment, the method may further comprise washing the EVs that are lightly and releasably entrapped within the wider entry portion of the pores, e.g., with a buffer or other rinsing fluid, for example, by flowing such a buffer or other washing fluid in a forward direction (same flow direction that resulted in entrapment of the EVs, from entry surface to exit surface of the filter). In an embodiment, the number of such rinses applied may be from 0, or 1 to 5, or 1 to 3, such as 2 rinses, which has been found to be particularly helpful in reducing protein and other contamination without reducing the yield of EVs. In an embodiment, the volume of the rinsing fluid for each rinse may be 10%-100%, 25%-75%, or about 50% that of the biological sample (e.g., two 5 mL rinses, for a 10 mL sample). Rinsing with a high volume of fluid may be desirable when purity of isolated EVs is particularly important. Multiple rinse cycles may use identical or different rinsing buffers.

In an embodiment, flow of washing fluid increases the purity of EVs captured on the filter, resulting in higher purity of EVs that are recovered through flow reversal.

In an embodiment, the reverse flow used to dislodge and recover the EVs or other desired particles from the entry surface (and within the narrowing pores) of the filter media may have a volume that is significantly less than that used for rinsing, as compared to the sample size. For example, the volume of the reverse flow may be from 1%-10%, 2%-8%, or about 4% that of the biological sample (e.g., two 200 μl reverse flows ((400 total), for a 10 mL sample).

In an embodiment, the similarly sized soft, low-density lipids or proteins that may become permanently entrapped (not released during flow reversal) include at least one of low-density lipoprotein (LDL), very low-density lipoprotein (VLDL), or protein agglomerates.

In an embodiment, passing the biological fluid through the asymmetric depth filter is facilitated through centrifugation. Alternative methods are also possible, e.g., including but not limited to mechanisms that provide for fluid displacement or pressure-driven flows normal or tangential to the depth filter medium.

In an embodiment, the driving force may be provided by centrifugation at relatively modest speed of rotation such as available with standard laboratory equipment (e.g., far lower than used in ultracentrifugation), such as less than 1000×g, less than 800×g, but greater than 500×g, such as about 700×g.

In an embodiment, the filter comprises cellulose acetate. Other materials providing similarly low protein binding and/or negative surface charge may also be suitable for use, such as regenerated cellulose, polyether sulfone, or aramid. Combinations of various materials may be used.

Another embodiment relates to a system including isolated EVs on the asymmetric depth filter, the system including the asymmetric depth filter having asymmetric pores where the pores are wider at the entrance portion (e.g., the pore entrance) of the filter and narrower at the exit portion of the filter (e.g., the pore exit), and where EVs are lightly and reversibly entrapped within the wider portion of the pores of the asymmetric depth filter, where such lightly and reversibly entrapped EVs can be released from the filter by flowing fluid in a reverse direction (e.g., flow reversal created by flowing a resuspending fluid backwards through the filter, from the "exit surface" of the filter media, with the narrow end of the pores, towards the "entry surface" of the filter media, with the wider end of the pores). In other words, such backward or reverse flow is from the exit surface to the entry surface of the filter media, which dislodges the lightly and reversibly entrapped EVs from the asymmetric pores. Such a system may be used as an EV storage device or tool by capturing and storing EVs until they are to be therapeutically delivered (e.g., by a topical application of the DF filter to a delivery site) or recovered with a reverse flow for a downstream molecular analysis, for example, in diagnostic or laboratory applications. The delivery rate of therapeutic EVs may be passively controlled by using a biodegradable filtration medium with a customized degradation rate, application of ultrasound, application of an electric field, or other mechanisms to actively control the rate of the EV delivery. A biodegradable and biocompatible DF medium may be used as a patch applied to accessible sites (e.g., skin, eyes, mouth) or to deliver EVs internally to a desired tissue or system after implantation at the desired internal site of delivery.

The ability to use the same depth filter media as both the media to isolate EVs from their source biological fluid, storing such EVs in a purified, isolated form on the same media, and then using that same media to then deliver the EVs to a desired surface or site to provide therapeutic benefit, or other purpose, is particularly advantageous in applications when isolated EV cannot be used immediately or must be accumulated for on-demand use.

In an embodiment, such a system may further include soft, low-density lipids or proteins having a size similar to the EVs, where such soft, low-density lipids or proteins are permanently entrapped within the pores of the asymmetric depth filter.

In an embodiment, the similarly sized soft, low-density lipids or proteins include at least one of low-density lipoprotein (LDL), very low-density lipoprotein (VLDL), or protein agglomerates.

In an embodiment, the asymmetric pores may be tortuous.

In an embodiment, the asymmetric pores may be conical.

Another embodiment is directed to a method for delivering high purity isolated EVs from an asymmetric depth filter, the method including providing the asymmetric depth filter having asymmetric pores where the pores are wider at the entry portion of the asymmetric depth filter (e.g., at the pore entrance) and narrower at the exit portion of the filter (at the pore exit) where the filter includes EVs that are lightly and reversibly entrapped within the wider portion of the pores of the filter, wherein such lightly and reversibly entrapped EVs can be released from the filter through a flow reversal imposed by different technique. The method may optionally include subjecting the asymmetric depth filter to such flow reversal by passing a carrier fluid through the depth filter along a reversed flow pathway (i.e., from the exit surface to the entrance surface), entering the pores from the narrower exit portion, and exiting the pores at the wider entrance portion, such reversed flow releasing the lightly and releasably entrapped EVs for delivery to a desired location or substrate (e.g., for therapy or further analysis, further separation, or other use) for downstream diagnostic, treatment monitoring or laboratory analysis.

In an embodiment, the filter further includes soft, low-density lipids or proteins having a size similar to the EVs, where the soft, low-density lipids or proteins are permanently entrapped within the pores of the asymmetric depth filter, below the lightly and releasably entrapped EVs.

In an embodiment, the similarly sized soft, low-density lipids or proteins include at least one of low-density lipoprotein (LDL), very low-density lipoprotein (VLDL), or protein agglomerates.

In an embodiment, the asymmetric pores may be tortuous.

In an embodiment, the extracellular vesicles or other desired nanoparticles are stored in hydrated, dried, lyophilized, frozen, or other form that prevents or minimizes their degradation during short-term or long-term storage until recovery or delivery.

In an embodiment, the method may be performed as part of a therapeutic procedure for a patient.

In an embodiment, the method may be performed as part of a diagnostic procedure for a patient.

In an embodiment, the extracellular vesicles or other desired nanoparticles are delivered without imposing any reverse flow but are delivered by passive diffusion (or diffusion aided by application of ultrasound, electric field, pressure gradient, or other mechanisms) of the extracellular vesicles or other desired nanoparticles from the asymmetric depth filtration medium in which they are captured. Other forms of migration (e.g., passive) of the EVs are also possible (e.g., convective release of the desired nanoparticles).

In an embodiment, the rate of diffusion of captured extracellular vesicles or other desired nanoparticles is customized using a degradable asymmetric depth filtration medium.

In an embodiment, the asymmetric depth filtration medium is biocompatible and/or biodegradable.

In an embodiment, the biocompatible asymmetric depth filtration medium infused with therapeutic extracellular vesicles or other therapeutic nanoparticles isolated from biological or other fluids is applied to a treatment site as a patch or a bandage.

In an embodiment, the treatment site is on the skin or other accessible body location of a patient.

In an embodiment, the treatment site is a wound.

In an embodiment, a biocompatible and biodegradable asymmetric depth filtration medium infused with therapeutic extracellular vesicles or other therapeutic nanoparticles isolated from biological or other fluids is applied to a treatment site as a patch or a bandage.

In an embodiment, the rate of diffusion of therapeutic extracellular vesicles or other desired therapeutic nanoparticles isolated by asymmetric depth filtration is customized by a degradation rate of the filtration medium.

In an embodiment, the rate of diffusion of therapeutic extracellular vesicles or other desired therapeutic nanoparticles is aided by applying ultrasound, electric field, pressure gradient, or other mechanisms to actively control the rate of nanoparticle release from the filtration medium.

Another embodiment relates to a method of treatment, wherein a biocompatible and biodegradable asymmetric depth filtration medium infused with therapeutic extracellular vesicles or other therapeutic nanoparticles isolated from biological or other fluids is applied to a treatment site as a patch or a bandage.

In an embodiment, the treatment site (e.g., a wound) is on skin or another accessible body location of a patient.

Another embodiment relates to a method of treatment, wherein a biocompatible and biodegradable asymmetric depth filtration medium infused with therapeutic extracellular vesicles or other therapeutic nanoparticles isolated from biological or other fluids is applied to an internal treatment site (e.g., delivered internally through a surgical procedure, and implanted there).

Features from any of the disclosed embodiments may be used in combination with one another, without limitation. This summary is provided to introduce a selection of concepts in a simplified form that are further described below in the detailed description. This summary is not necessarily intended to identify key or essential features of the claimed subject matter, nor is it intended to be used as an indication of the scope of the claimed subject matter.

Additional features and advantages of the disclosure will be set forth in the description which follows, and in part will be obvious from the description, or may be learned by the practice of the disclosure. The features and advantages of the disclosure may be realized and obtained by means of the components and combinations particularly pointed out in the appended claims. These and other features of the present disclosure will become more fully apparent from the following description and appended claims, or may be learned by the practice of the disclosure as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the drawings located in the specification. It is appreciated that these drawings depict only typical embodiments of the invention and are therefore not to be considered limiting of its scope. The invention will be described and explained with additional specificity and detail through the use of the accompanying drawings in which:

FIG. 1a is an SEM image of the depth-filtration membrane showing its edge and the entrance surface (Surface 1—the top or entry surface). A higher magnification (inset) of inlet pores in Surface 1 shows apertures much larger than the size of EVs. For example, the inset shows irregular shaped pore entrances, more than 500 nm in size. Exit pores shown in FIGS. 1e and 6b are smaller (e.g., 50-250 nm).

As a result of this asymmetric and tortuous geometry of pores, forward flow drags vesicles inside the pores until they become immobilized within the depth of the filter.

FIG. 1b is a schematic illustration of the depth filtration process showing two populations of particles of different sizes. Larger particles are retained within the volume of the filtration medium, while smaller particles are eluted.

FIG. 1c illustrates an exemplary DF cartridge.

FIG. 1d shows a summary of an exemplary depth-filtration workflow to isolate EVs from blood plasma, urine, and cell culture media.

Figure 1E:
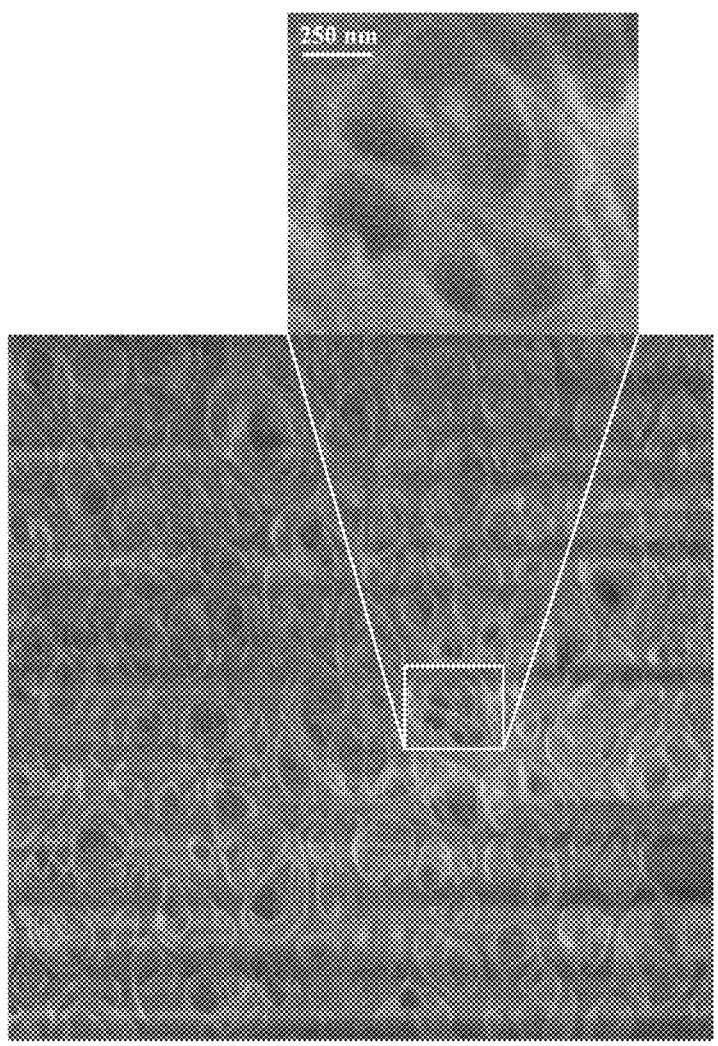
FIGS. 1a-1d show depth-filtration medium, cartridge, and an exemplary protocol for DF isolation of EVs from blood plasma, urine, and cell culture media.

FIG. 1e shows an SEM image of Surface 2 (the bottom or exit surface), showing smaller apertures for exit pores as compared to the size of the entrance pores shown in FIG. 1a.

Figure 1F:
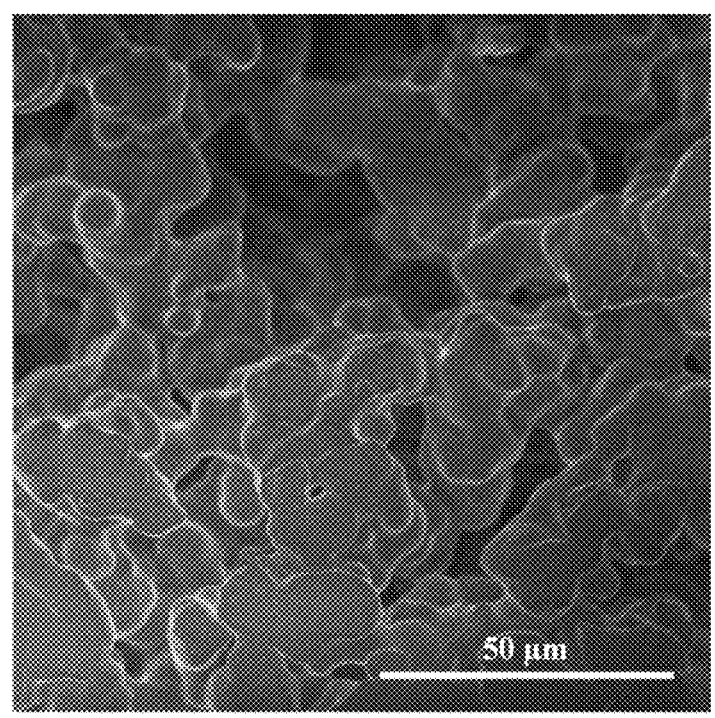

FIG. 1f shows an SEM image of a porous wafer supporting the cellulose acetate membrane inside the DF cartridge shown in FIG. 1c.

FIGS. 2a-2f show characterization of EVs isolated from plasma, urine, and cell culture media by depth filtration.

Figure 2A:
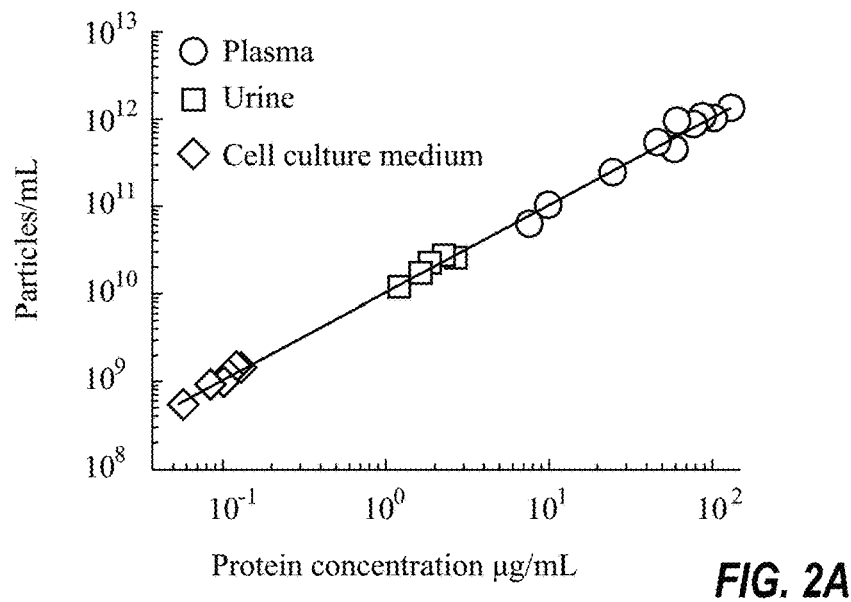

FIG. 2a shows the number of EVs versus protein concentration in undiluted source biofluids. The slope of the fitted curve is $1.05 \times 10^{10}$ particles/mL per µg protein.

Figure 2B:
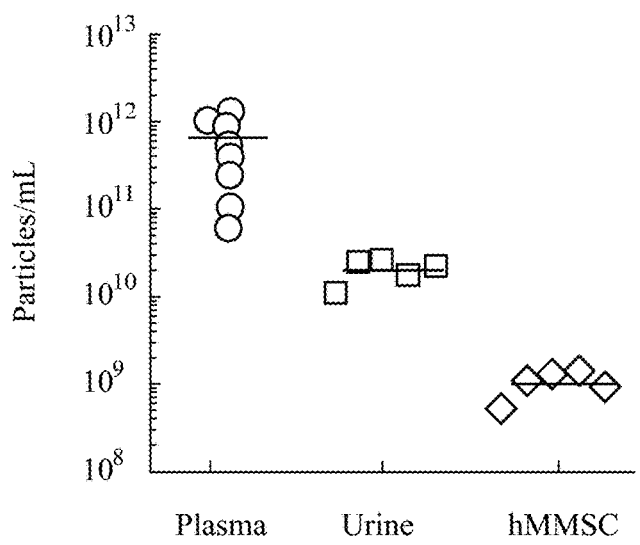

FIG. 2b shows that the number of plasma EVs isolated by depth filtration was substantially higher than in the urine. The concentration of EVs in the growth medium was much lower than in plasma and urine (body fluids).

Figure 2C:
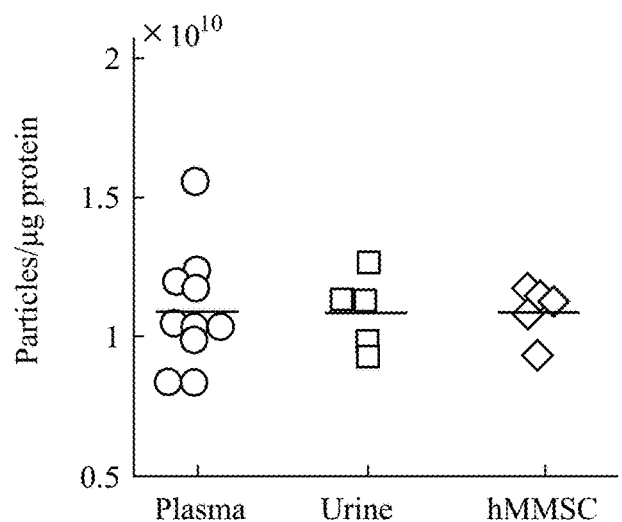

FIG. 2c shows the number of EVs isolated by DF per µg of proteins in plasma (n=10), urine (n=5), and media of multipotent mesenchymal stromal cells obtained from Wharton jelly (n=5). Greater numbers indicate a higher purity of the isolation. The depth filtration consistently produced EV isolation with low protein contamination for all biofluids and biological repeats.

Figures 2D, 2E:
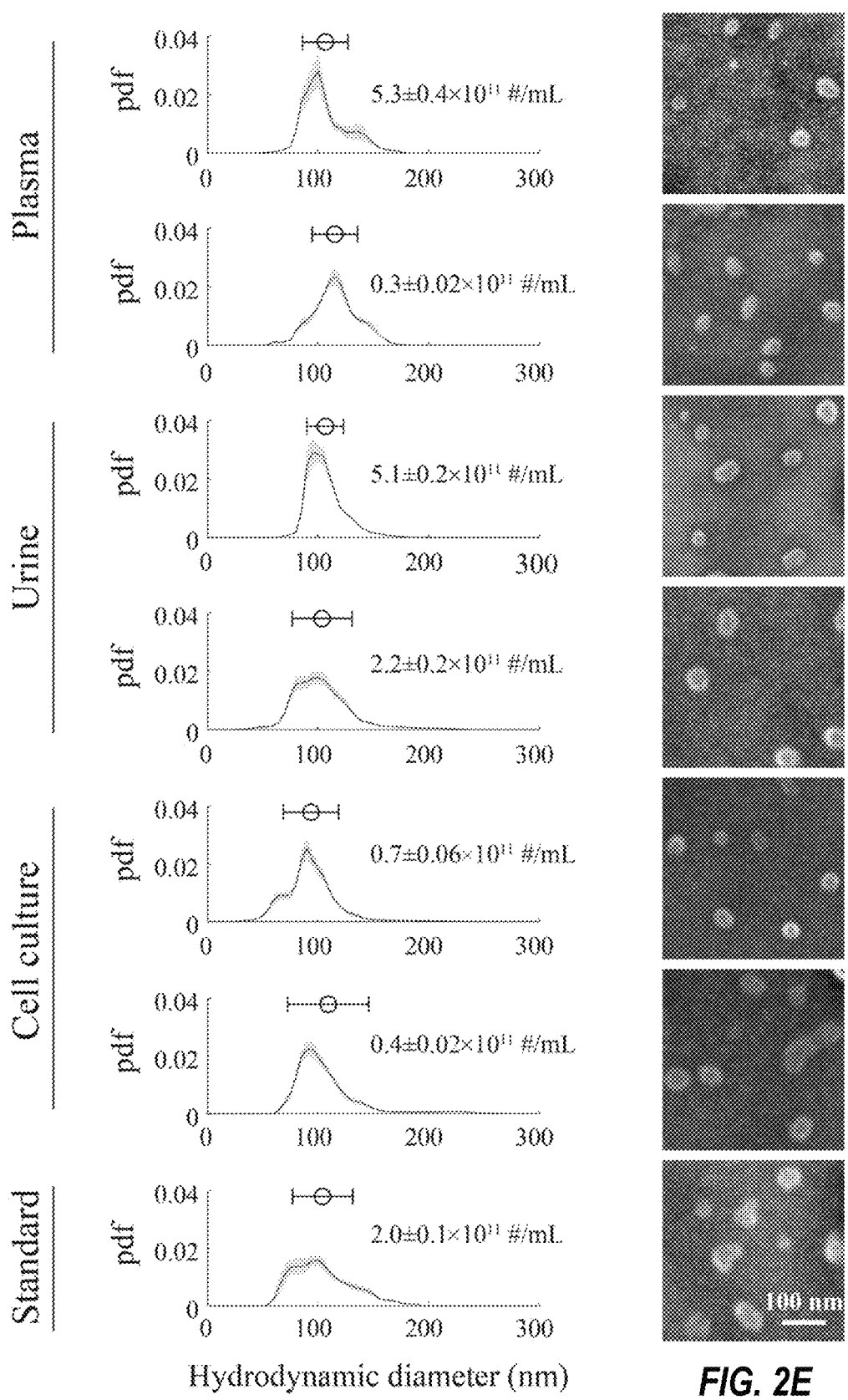

FIG. 2d shows hydrodynamic diameters of isolated EVs in two randomly chosen samples of each biofluid and in a purchased EV standard. The size distributions are shown as empirical probability density functions (pdf). The mean±standard deviation for each distribution is shown as a circle crossed by a horizontal bar. Each distribution plot lists EV concentration for that sample (#/mL±standard error). Each row of results in FIGS. 2d-2e and 2f corresponds to the same sample.

FIG. 2e shows SEM images of EVs isolated by asymmetric depth filtration.

Figure 2F:
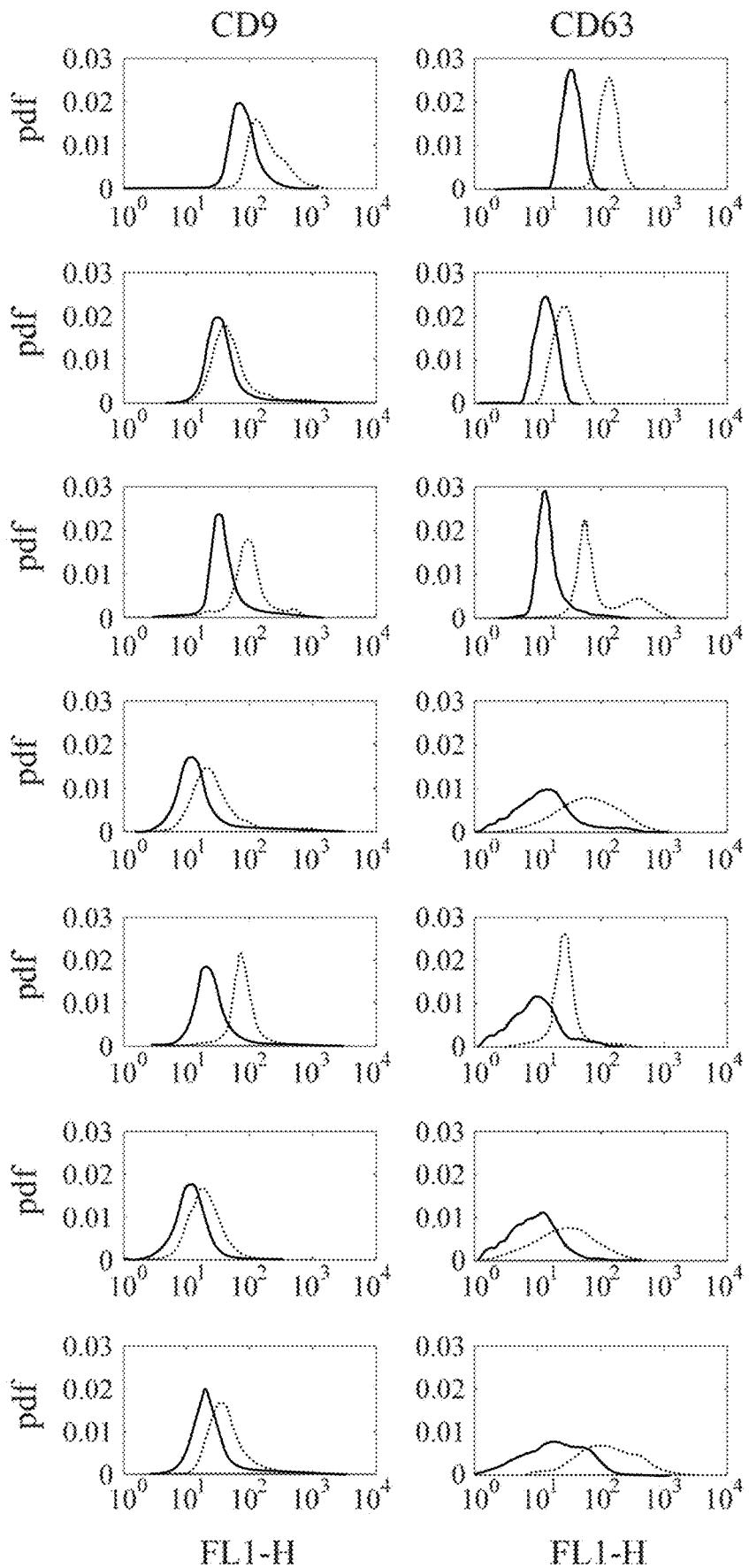

FIG. 2f shows fluorescence-activated cell sorting (FACS), showing positive CD9 and CD63 biomarkers expression in all EV isolations. Solid-line distributions (always shown to the left in FIG. 2f) in FACS plots are controls obtained when primary antibodies were not added to the samples. FACS counts were normalized to express the results in pdf form. At least 20,000 events were read in the FL1 channel for every sample.

FIG. 3a shows an SEM image of the DF membrane after isolating previously purified plasma EVs. The arrows indicate vesicles inside the pores and on Surface 1 (the top or entry surface) of the membrane.

FIGS. 3b-3e further characterize the isolation of human plasma EVs by depth filtration.

FIG. 3b shows a known number of purified and lyophilized EVs (Feed) that were suspended in a buffer following the manufacturer's instructions and then recaptured by DF. "Permeate" indicates the number of EVs carried across the filter by the forward flow during the isolation (16.4±1.6% of the Feed). Particles lost to the permeate during two washes of captured EVs are labeled as Wash 1 and Wash 2 (9.7±1.0% and 7.3±0.8% of Feed, respectively). Recaptured particles re-suspended by the reverse flow are marked as Recovered (58.7±12.5% of Feed).

FIG. 3c shows hydrodynamic size distribution of EV in Feed (mean=124±30 nm, mode=104±3 nm), Permeate (mean=121±37 nm, mode=106±4 nm), Wash 1 (mean=124±47, mode=114±3 nm) and Wash 2 (mean=126±41 nm, mode=125±2 nm), and Recovered (mean=147±45 nm, mode=121±6 nm). Note an increasing size of EVs eluted with the repeated flow in the forward direction.

FIG. 3d-3e show SEM images of EVs on Surface 1 (the top or entry surface) and inside the pores of the membrane after the first wash (FIG. 3d) and second wash (FIG. 3e) with the direct flow of the buffer.

Figure 3F:
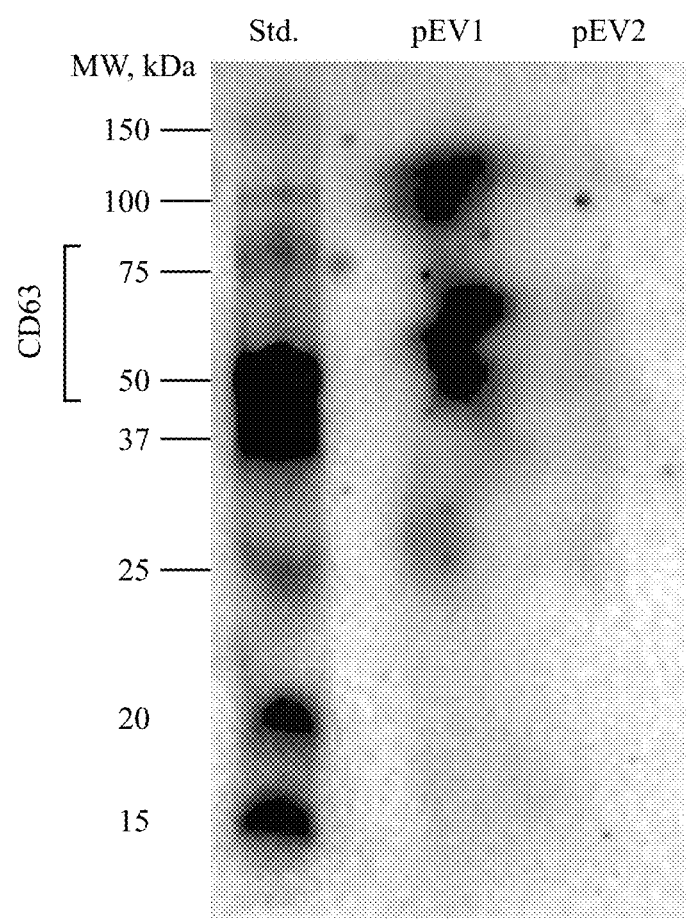

FIG. 3f shows a comparison of CD63 expression in plasma samples independently analyzed by FACS (FIG. 2f). CD63 was more abundant in the first sample (pEV1), in which the EV concentration was $5.3 \pm 0.4 \times 10^{11}$ #/mL. A lower expression in the pEV2 lane corresponds to the second sample containing EVs at a substantially lower concentration, $0.3 \pm 0.02 \times 10^{11}$ #/mL (FIG. 2d).

FIGS. 4a-4e show purity of EVs isolated by depth filtration from different biofluids, characterized by the expression of proteins in preparations.

FIG. 4a shows the twenty most abundant proteins in DF-isolated plasma EVs (pEVs) quantified by average relative iBAQ values, as determined by mass spectroscopy. The complete list of 165 identified proteins is given in the supplemental materials of the inventors' publication, Chernyshev et al., Asymmetric depth-filtration: A versatile and scalable method for high-yield isolation of extracellular vesicles with low contamination, J. of Extracellular Vesicles, Vol. 11, Issue 8, (August 2022), herein incorporated by reference its entirety. Circles indicate values in three repeated proteomic characterizations of the same pEV sample, P1.

FIG. 4b shows relative abundance of nine apolipoproteins in a pEV preparation as determined by HPLC-MS analysis.

FIG. 4c shows the expression of apolipoproteins A1 and B in Western blots of three pEV preparations (pEV1 . . . 3), indicating their significant depletion by depth filtration of source plasma of different donors (P1 . . . 3). Here, pEV1 is the same preparation characterized by mass spectroscopy in FIGS. 4a and 4b. P1 plasma sample was also used to compare DF, UC, and SEC isolation methods in FIGS. 5a-5g.

FIG. 4d shows immunoblotting of EV preparations, indicating the highly effective elimination of urinary UMOD from DF isolations of urinary EVs (uEV1 . . . 3) obtained from the urine of three different donors (U1 . . . 3). FACS analysis of CD9 and CD63 expressions in uEV1 and uEV2 is shown in FIG. 2f.

FIG. 4e shows Western blotting results, indicating Calnexin was not expressed in EVs (cEV1 . . . 3) isolated from cell growth media (CM1 . . . 3) used to culture primary human MSCs obtained from Wharton jelly of three separate umbilical cords.

FIG. 2(f) shows CD9 and CD63 expressions in cEV1 and cEV2 samples determined by FACS.

Figure 4F:
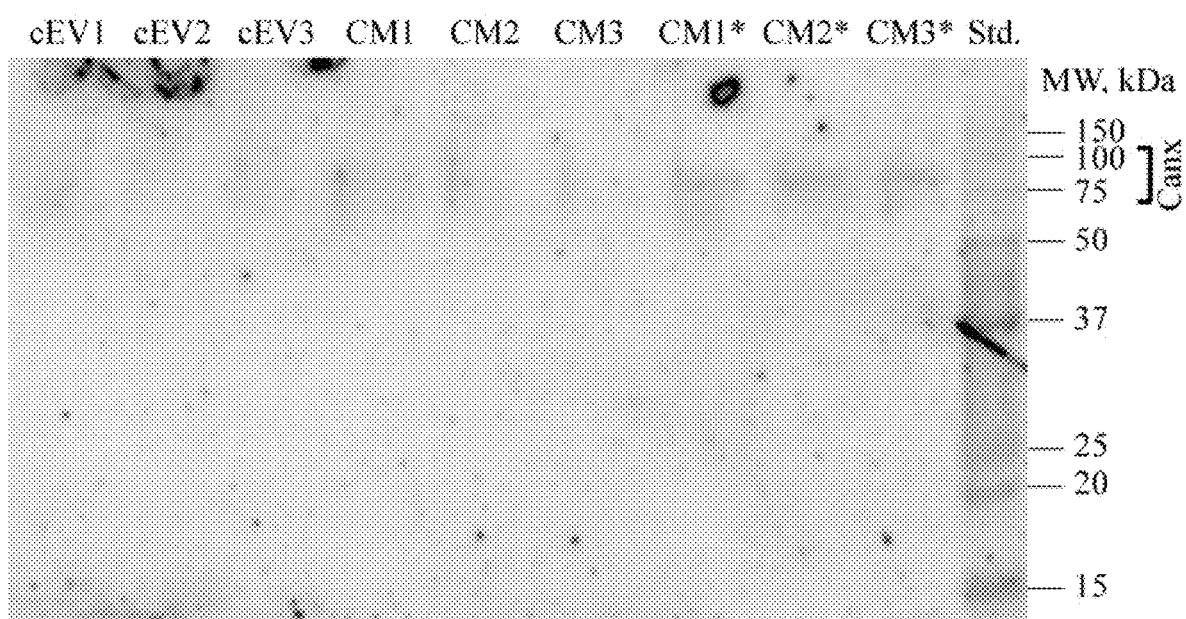

FIG. 4f shows the purity of EVs isolated from hMMSC culture media by depth filtration, as assessed by the expression of the lectin chaperone, Calnexin (Canx), in Western blots. Results show low Calnexin expression in three different culture media before centrifugation at 200×g for 8 minutes (CM1*-3*). After centrifugation, Calnexin is near absent (CM1-3) and becomes even less expressed in DF-isolated EVs (cEV1-3).

FIGS. 5a-5g show a comparison of plasma EVs (five aliquots of P1 sample) isolated by DF, SEC, and UC.

FIG. 5a plots probability density functions showing the distribution of hydrodynamic diameters of pEVs isolated by different methods.

FIG. 5b shows NTA measurements of EV concentration in different isolations.

FIG. 5c shows EVs isolated per mL of plasma. The yield by depth filtration is substantially higher compared to the alternatives.

FIG. 5d shows the number of EVs per µg of proteins, assessing the purity of EV samples. Co-isolated proteins were at low and comparable levels in DF and SEC preparation and twice as high in UC isolations.

FIG. 5e shows SEM images of EVs labelled with CD9, EpCAM, and CD63 primary antibodies. Bright dots on EV membranes are 20-nm gold nanoparticles reporting the locations of biomarker expression.

FIG. 5f shows Western blots for EV preparations by different isolation techniques, which show the highest expression of exosomal biomarkers CD63, EpCAM, and CD9 in the EV sample isolated by DF. The difference in EV concentrations (FIG. 5b) contributes to the obtained biomarker expressions. Contaminations evaluated by negative controls (calnexin and human serum albumin) are the lowest in SEC and DF-isolated samples.

FIG. 5g shows flow cytometry analysis of positive expressions of CD63, CD9, and CD81 biomarkers in DF-isolated EVs.

Figure 5H:
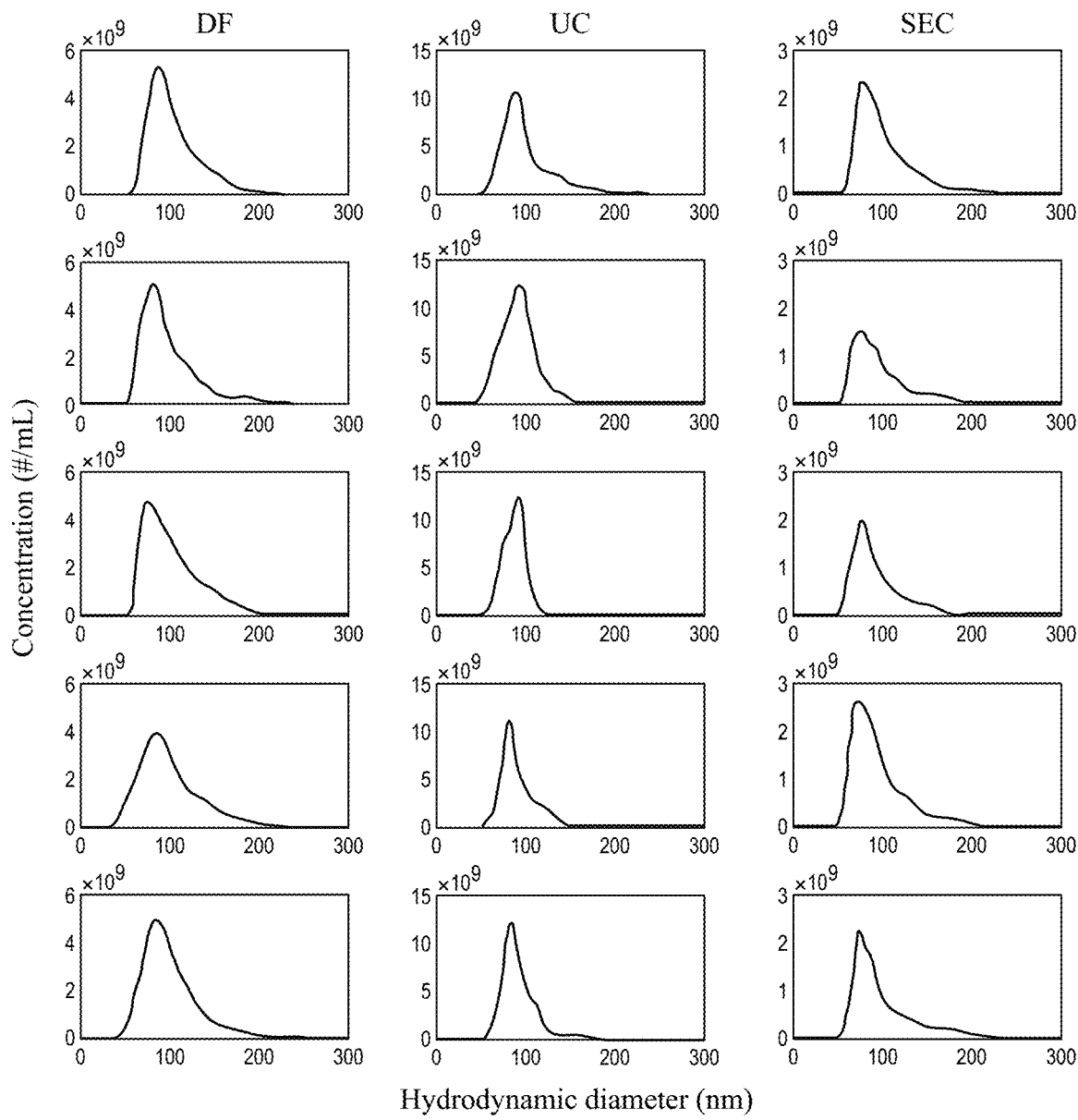

FIG. 5h shows NTA measurements of the hydrodynamic size distribution of plasma EVs isolated from sample P1 (five aliquots) by different methods.

Figure 5I:
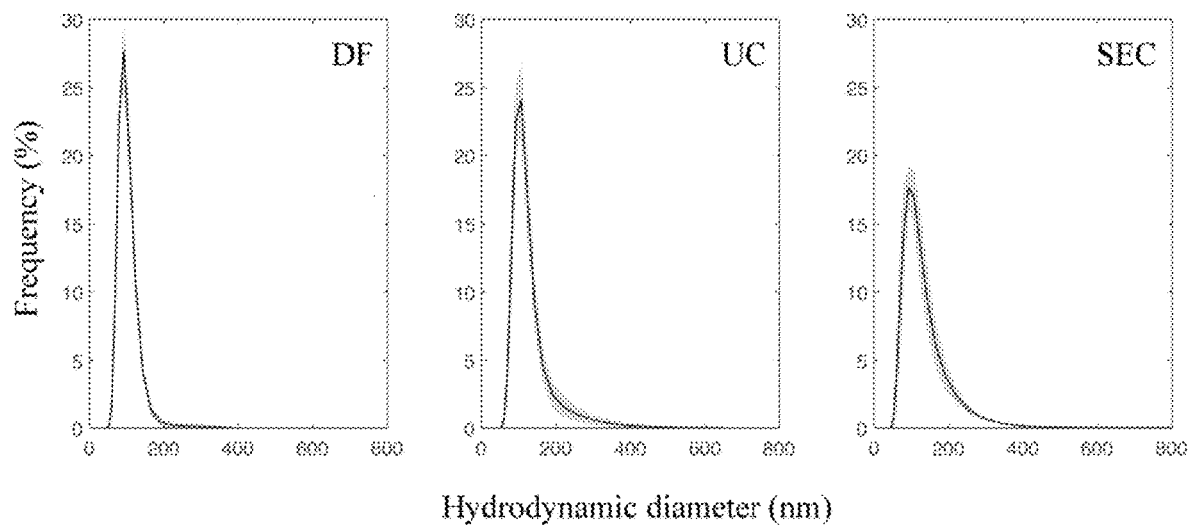

FIG. 5i shows DLS measurements of the hydrodynamic size distribution of plasma EVs isolated by DF, UC, and SEC. The solid lines show the mean of five repeats. The standard deviation is indicated by shading.

Figure 5J:
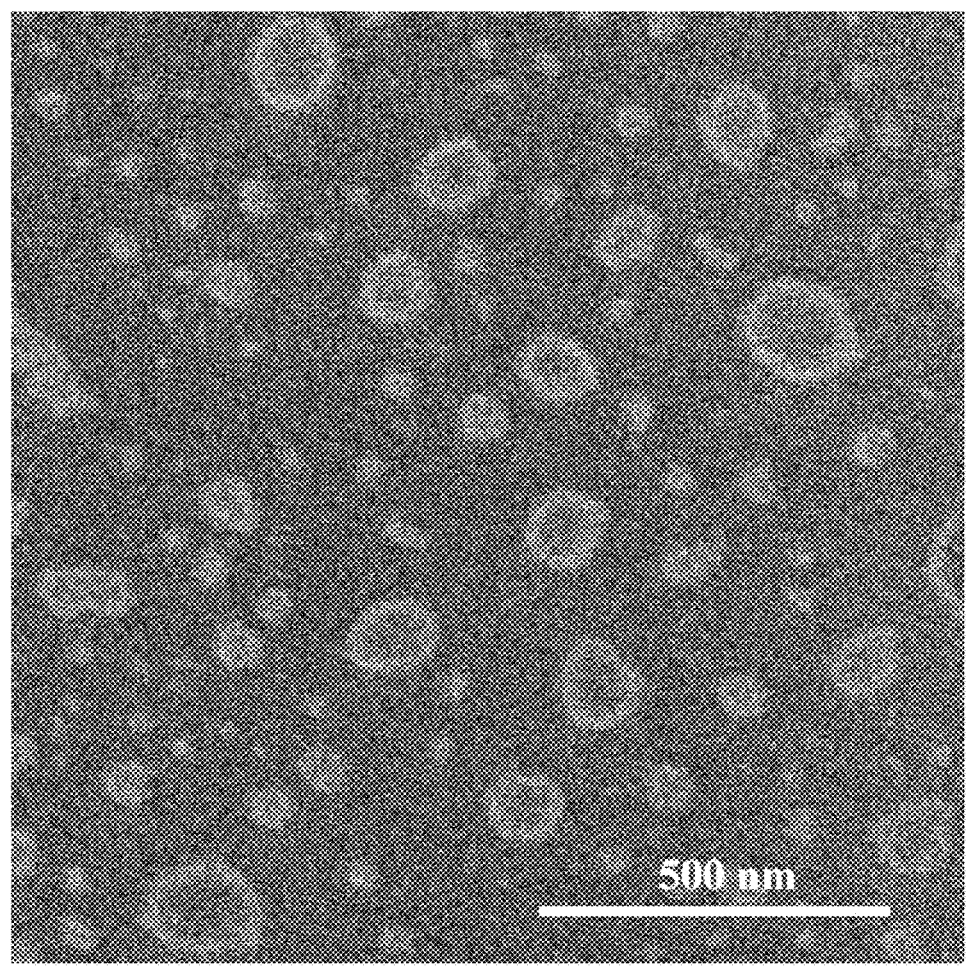

FIG. 5j shows an SEM image of desiccated plasma EVs isolated by asymmetric depth filtration.

Figure 5K:
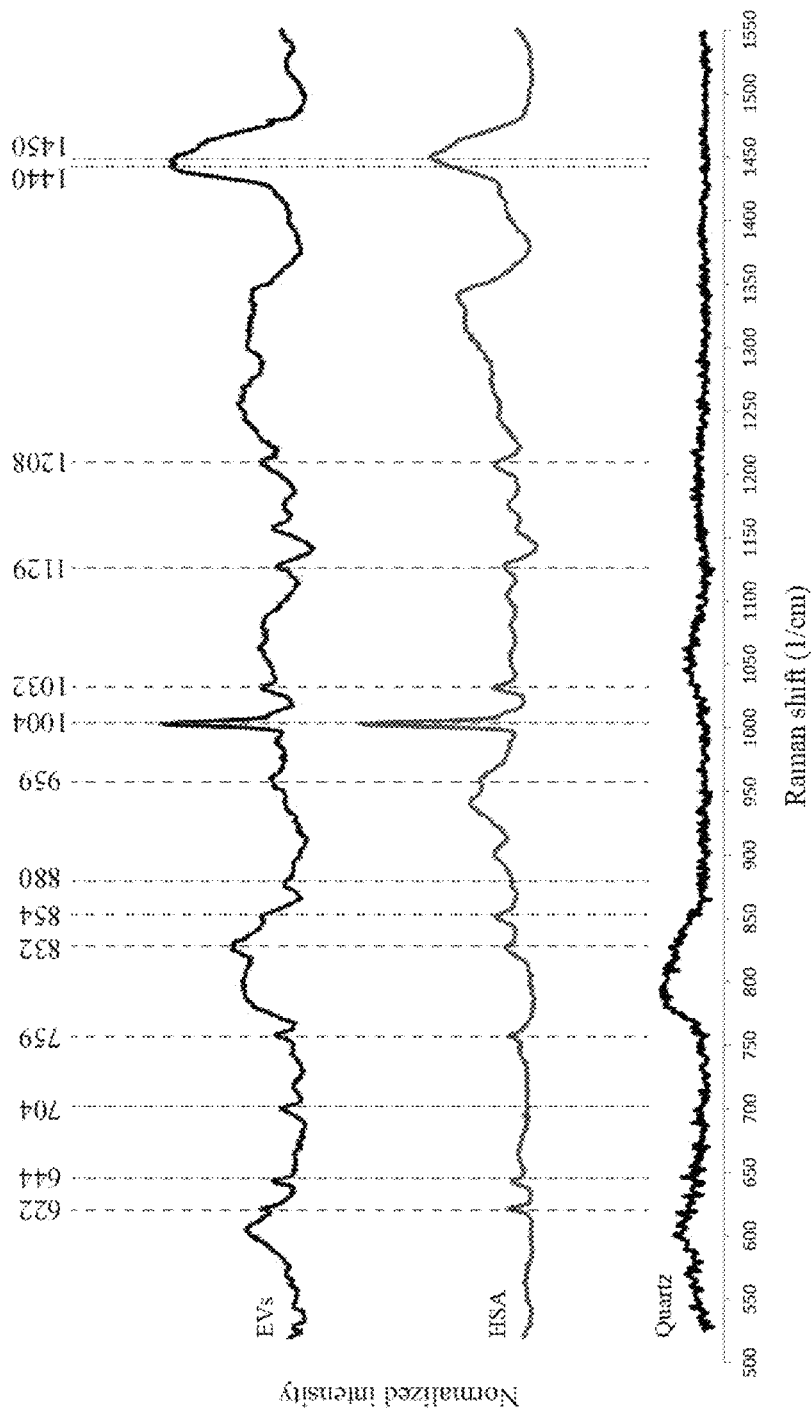

FIG. 5k shows Raman spectrum of plasma EVs isolated by depth-filtration, as compared to spectra of human serum albumin (HSA) and fused quartz substrate. The interpretation of observed peaks is given in Table 6.

Figure 5L:
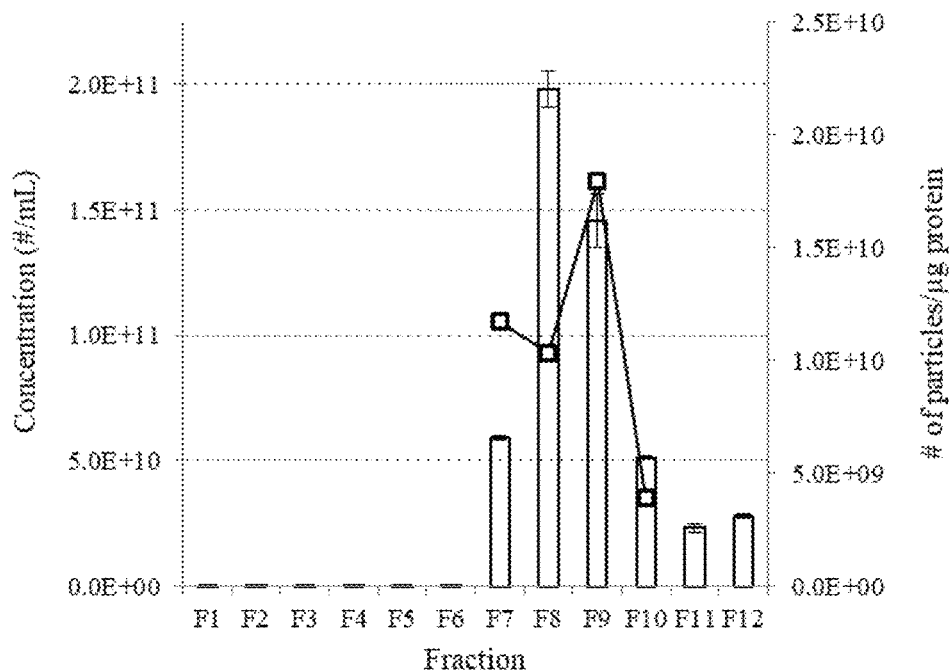

FIG. 5l shows NTA and BCA results for different 30-second SEC fractions of the P1 plasma sample. Fractions 7-9 have particle concentrations near $1 \times 10^{10}$ particles/µg protein (the line graph, read on the right scale). They were pooled as SEC isolation of EVs and compared with EV preparations obtained by depth filtration and ultracentrifugation.

Figure 5M:
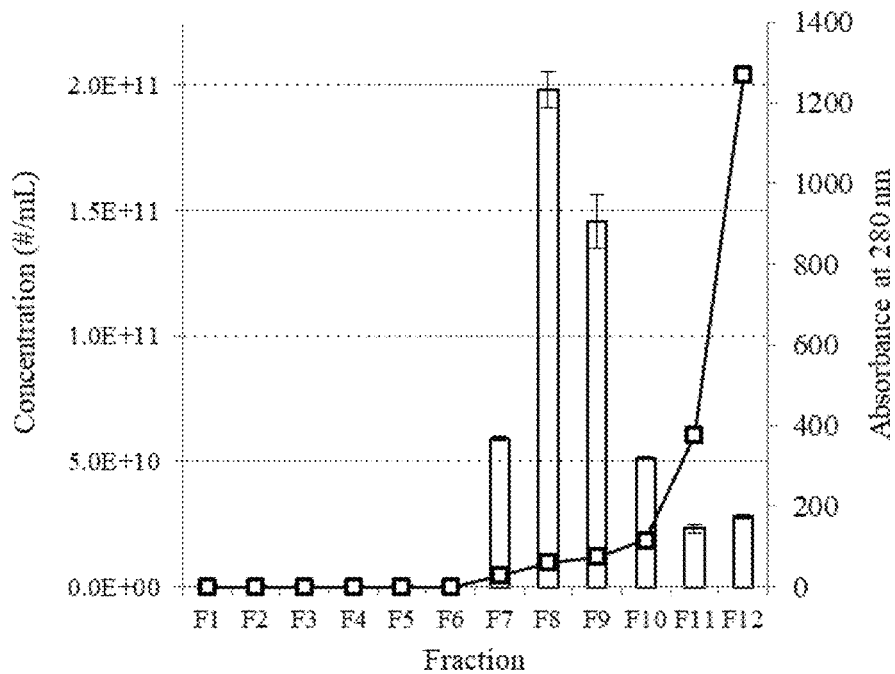

FIG. 5m shows results of NTA and Nanodrop Protein A280 measurements for SEC fractions of the P1 plasma sample. Fractions 7-9 have the optimal tradeoff between particle (histogram) and protein concentrations (the line graph, read on the right scale). A steep increase in absorbance starting with fraction F10 indicates a rapid rise in protein contamination in later fractions.

Figure 5N:
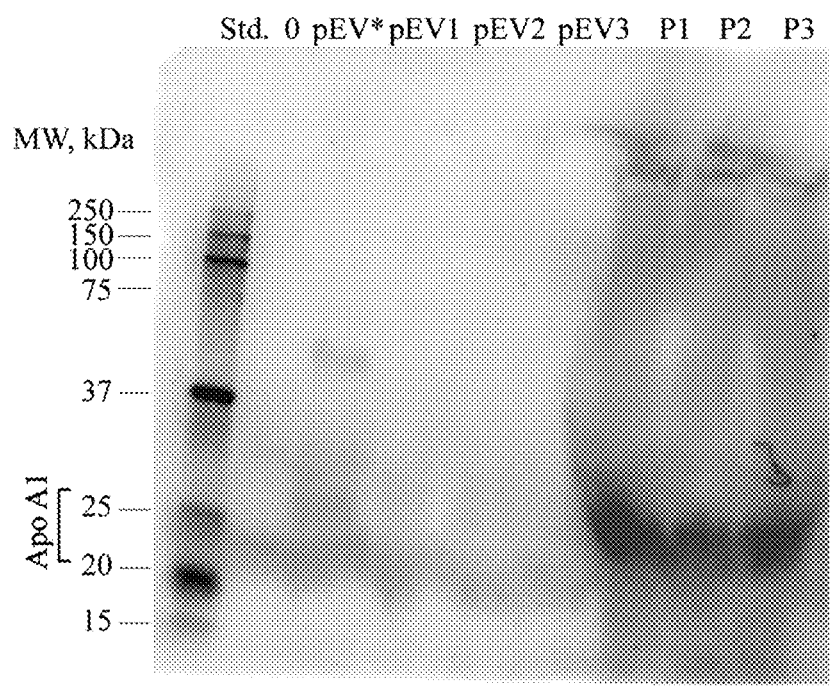
Figure 5O:
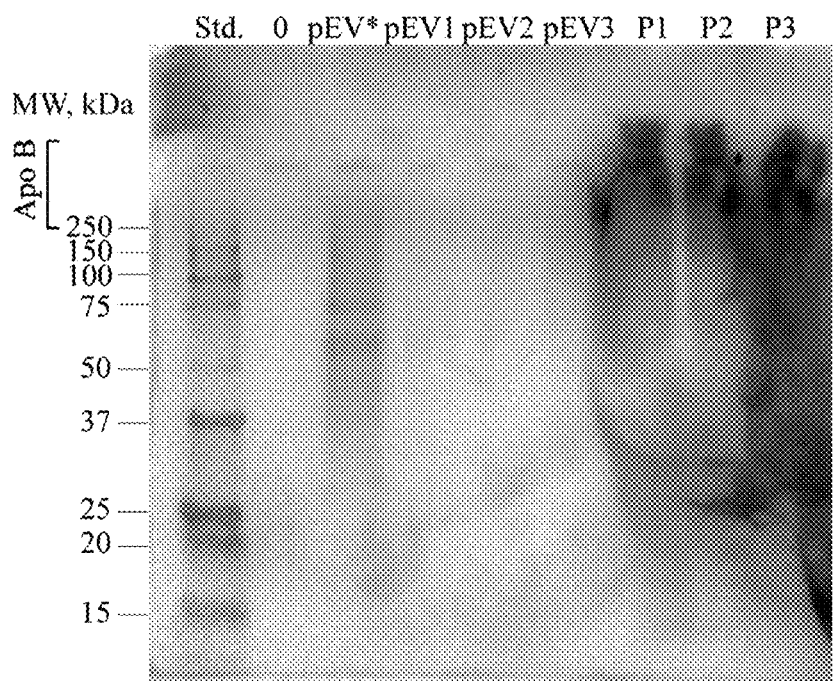

FIGS. 5n-5o show the purity of plasma EVs (pEV) isolated by depth filtration, as evaluated by Western blotting of apolipoprotein A1 and B. Zero ("0") represents empty wells. pEV* represents the apolipoprotein expression in a DF-isolated EV sample obtained after a single wash with 5 mL PBS. Apolipoproteins A1 (FIG. 5n) and B (FIG. 5o) in three pEV samples washed twice (pEV1 . . . 3) are significantly depleted compared to the source plasma of donors (P1 . . . 3), and less expressed than in pEV sample washed a single time (pEV*). The reduction in the expression indicates the importance of performing two washes in depleting apolipoproteins from plasma EV preparations.

FIGS. 5p-5t show comparison of EVs isolated from plasma sample P1 by DF, SEC, and UC. EV biomarkers CD9 (FIG. 5p), EpCAM (FIG. 5q), and CD63 (FIG. 5r) were most expressed in DF and least in SEC isolations. The difference in EV concentrations (FIG. 5q) contributed to the difference in expressions. Calnexin (Canx), which was used to evaluate sample purity relative to control (Cont.), appears absent in EVs isolated by all methods (FIG. 5s). As a control, the plasma sample was used without purification. Western blotting results in FIG. 5t show negligible albumin contamination of EV preparations obtained by all isolation methods. DF-isolated EVs without a buffer wash (DF-0) contain some albumin but less than control. After a single wash (DF-1), the expression is reduced considerably and disappears after the second (DF-2) wash. The third wash (DF-3) has no discernable impact.

FIG. 5u shows the purity of urine EVs (uEV) isolated by depth filtration as evaluated by Western blotting of uromodulin (UMOD). U0-3 lanes show the high expression of UMOD in the four examined urine samples. EVs were isolated from samples U1-3. After a single wash with 5 mL of PBS of EVs captured by the depth filter, the amount of UMOD in the EV preparation (uEV*) reduced relative to the source urine U1. After the second wash (uEV1-3), UMOD was nearly eliminated from all uEV samples.

FIG. 6a shows an SEM image of the cellulose acetate DF membrane after the PBS suspension of 100-nm latex beads was flowed through it. Beads are visible inside the pores (inset) and on the entry surface of the membrane (Surface 1—the top or entry surface).

FIG. 6b shows that beads were not observed on the exit surface of pores (Surface 2).

FIGS. 6c-6f show the capture of synthetic nanoparticles (100 nm latex beads and 20 nm gold nanoparticles functionalized with anti-mouse IgG), by depth-filtration.

Figure 6C:
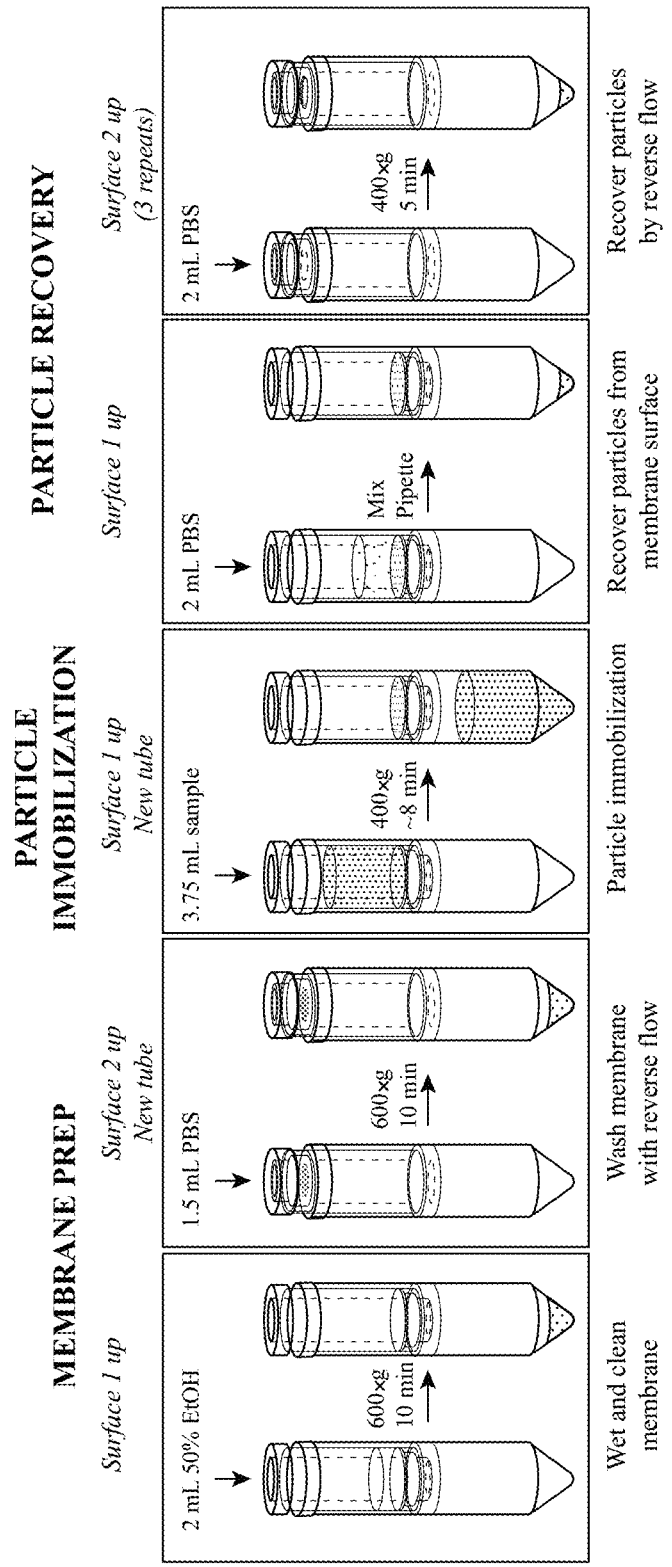

FIG. 6c shows the modified isolation protocol for synthetic samples flowing through the membrane with less resistance.

Figure 6F:
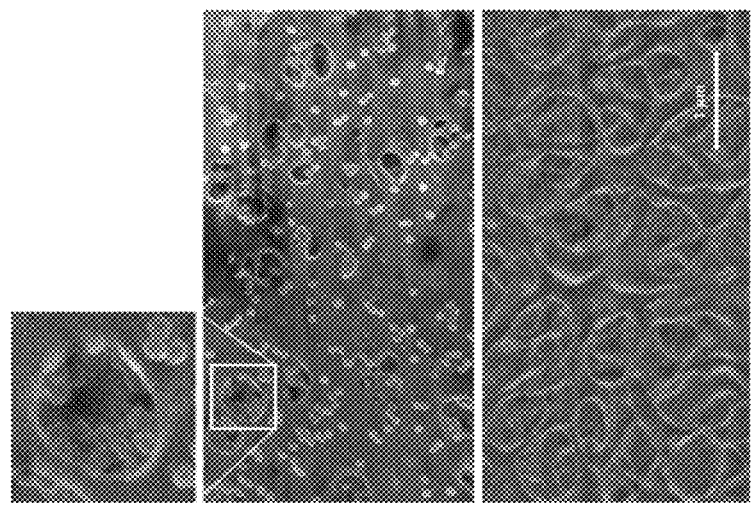
Figure 6E:
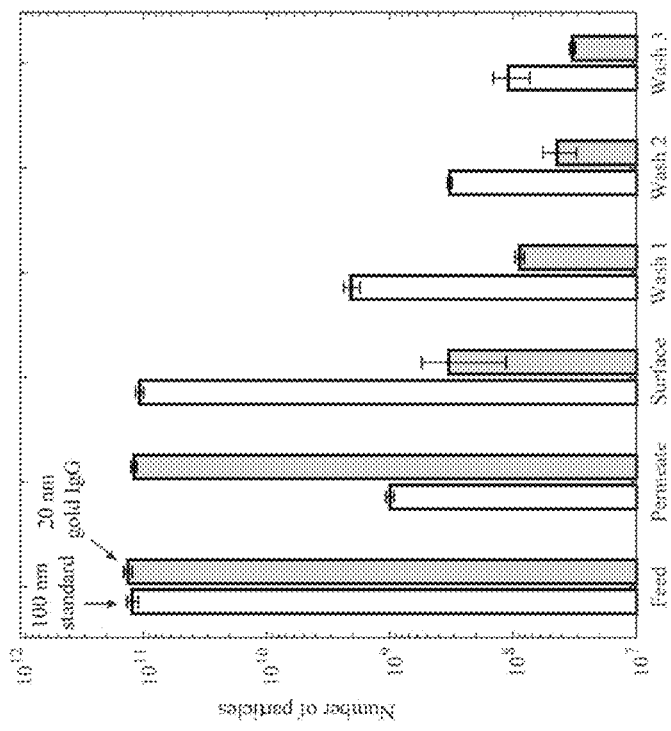
Figure 6D:
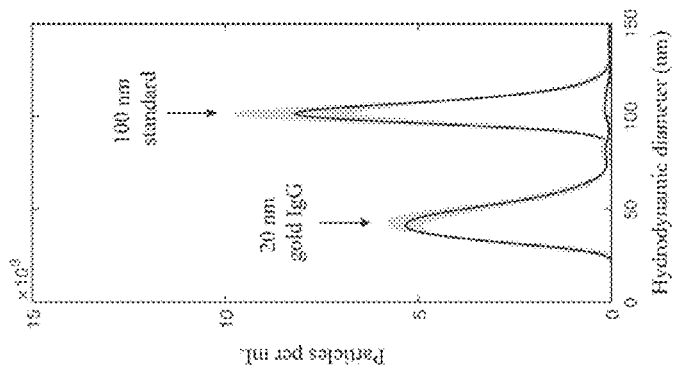

FIG. 6d shows the hydrodynamic diameters of latex beads and Au particles.

FIG. 6e shows the number of particles in Feed as compared with (i) the number of particles that transitioned through the filter (Permeate); (ii) those that were retained on its top surface and pore entrances and recovered by repeated aspiration of 2 mL of PBS (Surface); and (iii) those that were re-suspended by the reverse flow applied three times sequentially (Wash1 . . . 3).

FIG. 6f at the top shows an SEM image showing Surface 1 (top or entry surface) of the cellulose acetate membrane after 100-nm latex beads were flowed through it in the forward direction. Latex beads are seen on the surface and inside the pores (details in inset). The bottom SEM image shows Surface 2 (bottom or exit surface) of the membrane where beads were not present.

DETAILED DESCRIPTION

I. Introduction

The present disclosure is directed to use of asymmetric depth filtration in order to isolate EVs or other desired particles from a biological fluid with high yield, and high purity. Such systems and methods are simple, fast, easy to use, and inexpensive, requiring only standard laboratory equipment, making such systems and methods suitable for low resource and point-of-use locations. Such methods may be used for EV isolation from small biological samples in diagnostic and treatment guidance applications. Such methods and systems can also be scaled up, for harvesting therapeutic EVs from large volumes of cell culture medium.

In an embodiment, the present disclosure relates to a method for isolating EVs from a biological fluid in a single step, using an asymmetric depth filter, the method including providing the biological fluid including EVs, providing the asymmetric depth filter, where the filter has asymmetric pores, where the pores are wider at the entrance portion of the asymmetric depth filter where a sample enter it, and narrower at the exit portion of the asymmetric depth filter where the permeate exits it. The method includes passing the biological fluid (sample) through the asymmetric depth filter (in a single pass) where the fluid is introduced into the filter at the entry portion, so that components of the biological fluid pass through the wider entry portion of the pores before advancing towards the narrower exit portion of the pores, wherein EVs in the fluid become lightly and reversibly entrapped within the wider entry portion of the pores, while similarly sized soft, low-density lipids and/or proteins are pushed more deeply into the filter, so that the lightly and reversibly entrapped EVs are released into a fluid flowing in a reverse direction (backflow), while the similarly sized soft low-density lipids and/or proteins remain permanently entrapped within the pores of the filter. The present disclosure also describes related systems, as well as methods for storage and delivery of high purity EVs from such filter materials. For example, the EVs may be stored on such filter media until such time as it is desired to deliver the EVs for therapeutic use, analyze molecular content of EVs for diagnostic or other purposes, or otherwise used at a later time. Such methods and systems allow broad, unbiased extraction of EVs, with high yield, and high purity, based simply on their size and elasticity, while at the same time separating out similarly sized non desirable contaminant particles (e.g., lipids such as LDL and VLDL components, and protein agglomerates) that are softer than EVs we desire to isolate and recover. Such systems and methods allow for isolation, storage, and eventual delivery of high purity EVs, isolated with high yield, in a simple, cost-effective manner.

Unlike conventional surface filtration, the depth filtration (DF) medium as contemplated for use herein has pores too large to confine the target EV particles entirely on the filter's surface. Instead, particles are fractionated kinetically by the difference in their mobility through the medium. Solubilized components are eluted freely, while the transport of smaller particles is impeded but to a lesser degree than larger ones. Therefore, the carrier flow first elutes small particles. Larger particles are either eluted later or trapped within the depth of the filter. Such trapping may be caused by the pores' tortuous geometry and decreasing cross-section characteristics of the pores, as well as immobilized particles lodged within the pores, and other interactions with the filtration medium. The accumulation of trapped particles within the filter will eventually clog it, although since the entire medium participates in fractionation, not just the filter top or entry surface, depth filters can process much larger volumes of biofluid before losing their functionality as compared to other types of filter media. Furthermore, the filtering capacity may be entirely or partially regenerated by resuspending and eluting trapped particles by reversing the flow direction. Additives, such as surfactants and/or enzymes may be added to aid with any such regeneration. Pore sizes and geometry, surface and depth adsorption, and kinetic parameters—such as the flowrate, its duration, and fluid viscosity may be optimized to efficiently remove targeted impurities by depth filtration. On balance, DF is an adaptable and scalable separation method.

Depth filters typically have uniform pore aperture exceeding the size of impurities they are designed to deplete from the eluting product and may not have a distinct cut-off size. Instead, the separation is kinetic, a feature that DF shares with the SEC. However, proteins, other solubilized components, and smaller particles are eluted first during DF, the opposite of SEC.

Applicant proposes asymmetric depth filtration as a universally applicable method for high yield isolation of EVs with low contamination. The developed method immobilizes EVs on the surface and within the depth of porous medium and then recovers the EVs by reversing the carrier flow through the filter. In a single step (as compared to the complex multi-step process of Zhang et al. (2020)), it isolates EVs from complex biological fluids, such as plasma, with high yield and high purity. Applicant proposes mechanisms, and presents experimental evidence to support such, which explain the isolation of EVs by asymmetric DF and the contaminant depletion, leading to a desired reduction in the solubilized background and the number of lipid particles in plasma EV preparations. Applicant demonstrates that the performance of DF in the isolation of plasma EVs (pEVs) compares favorably with the optimized three-step isolation procedure developed by Zhang et al. (2020), A complex three-step protocol to isolate extracellular vesicles from plasma or cell culture medium with both high yield and high purity, *Journal of Extracellular Vesicles*, 9, 1791450), herein incorporated by reference in its entirety. The present disclosure quantifies the advantages of DF in terms of yield and purity of the isolated pEVs in direct comparison with two established and widely used isolation methods—ultracentrifugation (UC) and size-exclusion chromatography (SEC).

In the current implementation, the developed method may be suitable for use in applications in EV isolations for diagnostic tests and other applications requiring small biofluid volumes, which may be performed at point-of-care and low-resource locations. With a scale-up to meet bio-manufacturing requirements, the method is suitable for isolating therapeutic EVs from large volumes of growth medium used to culture EV-secreting producer cells. To Applicant's knowledge, Applicant's is the first report on the isolation of EVs by asymmetric DF.

II. Materials and Methods

Biological samples (blood, urine and Wharton's jelly of umbilical cords) were collected with written informed consent from healthy donors. Blood was drawn into EDTA-treated tubes (VACUETTE K2E K2EDTA, Greiner Bio-one, Austria). Cells were removed by centrifugation for 10 min at 1000×g and 4° C. The supernatant was centrifuged again (2000×g and 4° C.) to remove platelets and obtain plasma. The collected urine was purified by discarding the pellet precipitated by 30-min centrifugation at 4500×g and 4° C. The samples were aliquoted (1.5 mL of plasma and 15 mL of urine) and stored in EPPENDORF tubes (Hamburg, Germany) at −20° C. until use.

Primary mesenchymal stem cells (MSCs) were isolated from the Wharton's jelly of umbilical cords, collected after cesarean section or vaginal births by healthy women who gave prior written informed consent. The isolation of multipotent mesenchymal stem cells (MMSCs) followed previously described protocols. Briefly, tissue samples were mechanically crushed and placed in 0.1% collagenase Type I solution (Gibco, Thermo Fisher Scientific, Waltham, MA, USA) for 1 h at 37° C. After incubation, the suspension was centrifuged for 3 min at 200×g. Precipitated cells were cultured inside 25 cm$^2$ culture flasks (Corning, Corning, NY, USA) at 37° C. in DMEM/F12 medium (1:1, Gibco) supplemented by 10% fetal calf serum, 2 mM L-glutamine, 100 U/mL of penicillin, and 100 µg/mL of streptomycin. $CO_2$ concentration in the atmosphere was maintained at 5%. Every 72 h, the culture medium was refreshed with 50% of a new medium. When 80% confluence was reached, cells were detached (0.05% trypsin), divided (1:2 ratio), and sub-cultured in 150 cm$^2$ culture flasks (Corning), each seeded with approximately 5×10$^6$ cells. After similar division, the third passage cells were expanded to 80% confluence, washed with 0.9% saline solution, and cultivated in serum-free DMEM/F12 (Thermo Fisher), supplemented with 2 mM of L-glutamine, 100 U/mL of penicillin, and 100 µg/mL of streptomycin medium. After 48 h of incubation, the serum-free medium was collected and used to isolate EVs released by human multipotent mesenchymal stem cells (hMMSCs).

The method described implements asymmetric DF, in which EVs are immobilized on the surface and within the depth of the filter, while small (e.g., lipid) particles, proteins and other solubilized components of plasma, urine and cell culture medium elute with the flow. EVs accumulate inside and on the surface of the filter (lightly and reversibly entrapped) and are later recovered by reversing the direction of the carrier flow.

Applicant used DF membrane fabricated by dry casting a mixture of cellulose acetates (CA) of different acetyl numbers following a method similar to that of Sossna et al., Structural development of asymmetric cellulose acetate microfiltration membranes prepared by a single-layer dry-casting method, Journal of Membrane Science, Volume 289, Issues 1-2, 2007, Pages 7-14, herein incorporated by reference in its entirety. Alternative fabrication methods and materials may be used to obtain the asymmetric depth filter. For example, regenerated cellulose, polyether sulfone, or aramid may be used as the filtration medium; track-etched membrane, acid treated on one side to impart anisotropy in pore aperture, is an example of an alternative fabrication technique producing conical pores. It will be apparent that a variety of different methods of fabrication are possible.

The cross-sectional morphology and pore asymmetry of the obtained membrane were characterized by electron microscopy. The SEM image of Surface 1 (the top or entry surface shown in FIG. 1a) shows entrance apertures of pores that are wider than EVs (e.g., exemplary EVs are sized at about 100 nm in hydrodynamic diameter). The pores narrow with depth into the membrane, which had a thickness of about 20 µm. The pores terminate with significantly smaller exit apertures seen in the SEM image of Surface 2 (the bottom or exit surface shown in FIG. 1e). When a sample flows in the forward direction through Surface 1 (the top or entry surface), EVs are retained inside narrowing and tortuous pores (FIG. 1b). The immobilized EVs may then be cleansed by the forward flow of a washing buffer to reduce contamination. The reverse flow of re-suspending buffer flowed in the opposite direction through Surface 2 (the bottom or exit surface) recovers the immobilized EVs from the membrane for downstream applications.

The present work used centrifugal forces to drive forward and reverse flows across the membrane. A disk of DF medium, 22 mm in diameter, was held inside a cylindrical acrylic cartridge (19/25 mm ID/OD) designed to fit inside a standard 50 mL centrifuge tube. FIG. 1c shows the complete DF assembly. It includes a metal sleeve with a stainless steel mesh supporting a porous wafer (FIG. 1f), which serves as a substrate for the DF membrane. Two silicone O-rings on either side of the membrane cushion the assembly from centrifugal forces, which were kept below 800×g. A threaded plastic bushing is used to securely tighten the membrane between O-rings, thus preventing the fluid from by-passing the membrane during centrifugation. A movable stop ring keeps the assembly inside a centrifuge tube. It slides along the cartridge between the thrust ring and threaded bushing. By manually changing the stop ring's position and reversing the assembly's orientation inside a 50 mL tube (i.e., flipping it), the direction of centrifugal forces and the liquid flow through the DF membrane can be reversed. In other words, for EV isolation and washing, forward flow is used, and for EV recovery, reverse flow is used.

Before EV isolation, the filter is wetted and conditioned. 2 mL of 50% ethanol is pipetted onto Surface 1 (the top or entry surface) of the membrane and forced in the forward direction (flow from the entry surface towards the exit surface) by centrifugation at 600×g for 10 min (FIG. 1d) or until all EtOH passes through the filter. This forward flow flushes potential contaminants from a new membrane. Next, the cartridge is flipped to change the membrane orientation, and 1.5 mL of 1×PBS is pipetted on Surface 2 (the bottom or exit surface) of the filter inside the small compartment of the cartridge, now facing up (FIG. 1d). The buffer is then flowed through the filter in the reverse direction to remove residual contaminants and ethanol by centrifuging the assembly for 10 min at 600×g.

EV isolation by DF was performed from 10 mL of biological fluids (diluted plasma and undiluted urine and growth medium). Each sample was loaded on Surface 1 (the top or entry surface) of the depth filter retained inside the DF cartridge, which was inserted into a 50 mL tube (FIG. 1d). The flow through the filter was imposed by centrifugation in a swinging bucket rotor at 700×g for 70-90 min or until the sample had passed through the filter. At the completion, the EVs were immobilized within and on the surface of the filter. Background impurities were removed by washing the immobilized EVs with 5 mL of PBS (washing buffer) flowed by centrifugation (700×g for 30 min) in the same direction as the source biofluid (forward flow). This step was repeated for a combined 10 mL of PBS passing through the filter to wash captured EVs.

The immobilized EVs were re-suspended by reversing the flow through the DF membrane. A cartridge was flipped to change the filter orientation and inserted into a new 50 mL tube. The re-suspending flow was created by centrifuging the assembly for 10 min at 700×g to drive 200 µl of 1 × PBS (re-suspending buffer) through the membrane in the reverse direction.

This step was repeated to liberate additional EVs trapped inside the filter, giving the combined ~400 µl of the preparation containing the isolated EVs for each plasma, urine, and cell culture medium sample. The EV-containing preparation was pipetted several times off and onto the filter to recover EVs remaining on Surface 1 (the top or entry surface), transferred into a 1.5 mL tube (EPPENDORF Protein LoBIND tube), and centrifuged for 15 min at 14,000×g to remove bubbles, often introduced by repeated pipetting. Degassed samples were stored at −20° C. until further analysis.

For comparison, human plasma EVs were isolated by ultracentrifugation. 30 mL of plasma was diluted 1:5 in PBS and aliquoted into five equal volumes. The diluted fluid was transferred into 50 mL tubes and spun at 4500×g at 4° C. for 30 min to pellet platelets, residual cells, and debris. The supernatant was transferred to new tubes, and the EV micro-vesicles were pelleted by 12,000×g centrifugation for 45 min at 4° C. The supernatant was carefully transferred to 26 mL polycarbonate bottles, and small-size EVs were isolated in two steps by ultracentrifugation using a 70Ti rotor (Beckman Coulter, Brea, CA, USA). First, the samples maintained at 4° C. were ultracentrifuged for 70 min at 100,000×g. The supernatant was discarded, and pellets were resuspended in PBS in new 26 mL bottles. The second ultracentrifugation (100,000×g for 70 min) produced EV pellets, which were re-suspended in 1 mL of PBS and stored at −20° C. in 1.5 mL tubes (Protein LoBIND tubes) until analysis.

For comparison, human plasma EVs were isolated by size-exclusion chromatography. The EV isolation followed the protocol provided by the column manufacturer (PURE-EVs, HansaBioMed, Estonia). The lower Luer cap was removed, and the column was washed with 15 mL PBS flowing at ~1 mL/min. The lower cap was then reinstalled, and PBS remaining above the column was removed. 1 mL of thawed plasma maintained at 4° C. was centrifuged for 30 min at 4500×g, and 500 µl of obtained supernatant was loaded into the prepared column. The lower cap was removed, and 30-s eluent fractions were collected. As the effluent exited the column, additional PBS was loaded to keep an uninterrupted flow. The flow rate through the column stayed constant at ~1 mL/min during the procedure, indicating nominal SEC operation. Isolation was repeated five times using different columns. Fractions enriched in EVs were pooled and stored at −20° C.

The identity of nanoparticles in plasma EV isolations was assessed by the expression of membrane proteins commonly associated with exosomes (CD9, CD63, and EpCAM). First, EVs were labelled with primary antibodies. As purchased primary Abs (murine anti-CD63, cat. 353013, BioLegend, San Diego, CA, USA; murine anti-CD9, 312102, BioLegend; rabbit anti-EpCAM, ab223582, Abcam, Cambridge, UK) were diluted in PBS containing 0.5% bovine serum albumin (PBS-BSA; pH=7.2-7.4) to a 1:200 ratio. Dilutions of different Abs were separately mixed with EV samples and incubated for 14 h at 4° C. The incubated samples were further diluted 1:5 in PBS-BSA, and unreacted antibodies were removed by centrifugal filtration (6500×g) through a filter with ~10-nm pores (Amicon Ultra Centrifugal 100 kDa molecular weight cutoff, MilliporeSigma, Burlington, MA, USA). The Ab labelled EVs retained by the filter were re-suspended for immuno-gold labelling.

The expression of CD9, CD63, and EpCAM on EVs labelled with primary Abs was visualized by SEM using gold nanoparticle reporters binding to Ab-labelled biomarkers. Applicant purchased two types of 20-nm Au nanoparticles, pre-functionalized with secondary mouse or rabbit class G immunoglobulin antibodies (Abcam Goat Anti-Mouse IgG H&L, ab27242; and Goat Anti-Rabbit IgG H&L, ab27237) designed to react with primary Abs used to label EVs. As received gold nanoparticles were diluted 1:1000 in PBS-BSA. 50 µl of EV samples labelled by either CD9, CD63, or EpCAM primary antibodies were mixed with 200 µl of diluted Au NPs functionalized with complementary secondary Abs. After incubating the mixture for 6 h at 4° C., unreacted gold nanoparticles were removed by filtration through a 30 nm filter (polycarbonate membrane purchased from Avanti Polar Lipids, Birmingham, AL, USA). EV-AuNP complexes and unreacted EVs retained by the filter were re-suspended in 50 µl of deionized water. A small drop of the suspension (~0.5 µl) was dried at ambient conditions on a clean silicon wafer. The wafer was placed on the specimen stage of SEM (Tescan MAIA3, Brno, Czech Republic), and the desiccated sample was imaged using an accelerating voltage of ~10.0 kV and magnifications between 100,000× and 500,000×. Gold nanoparticles reported the biomarker expression on the surface of EV membranes as bright spots in the obtained SEM images. SEM imaging without nano-gold labelling was also performed to visualize the morphology of plasma, urine, and cell culture EVs.

The hydrodynamic size distribution and the concentration of EVs were characterized by nanoparticle tracking analysis (NTA). Frozen EV samples were thawed and diluted in PBS to concentrations suggested by the manufacturer (Nanosight model NS-300 equipped with 45-mW 488 nm laser; Malvern, Salisbury, UK). Depending on the method used to isolate EVs, the required dilutions were between 1:100 and 1:1000. Within 1 min after the dilution, a sample was injected into the test cell and illuminated by the laser. The light scattered by particles was video recorded for 60 s by a high sensitivity sCMOS camera (camera level set to 14) at 25 frames per second. Each video consisted of 1498 frames. Approximately 30-50 particles were observed in the field of view during video capture, corresponding to concentrations between ~4×10$^8$ and 8×10$^8$ particles per milliliter. The recording was repeated five times for each sample, and the results of their analysis were averaged.

The videos were analyzed by Nanosight software (version 3.2) to measure the concentration of EVs, their size distribution, the mode and mean sizes, and the standard deviations of the results. During video analysis, minimum track length, maximum jump mode, and blur size were set to Auto. The detection threshold was 4. The viscosity of PBS was assumed to be that of water at the measured temperature. The NTA instrument automatically measured the sample's temperature, which stayed within 23-24° C. throughout the nanoparticle tracking experiments. The water viscosity at this temperature was nearly constant at ~0.91 cP.

The hydrodynamic size distribution of EVs was also characterized by dynamic light scattering (DLS). Thawed samples were diluted 1:1000 in PBS, and 1 mL of the preparation was transferred to a low-volume disposable sizing cuvette. After 5-min thermal equilibration inside the DLS instrument (Zetasizer Nano ZS, Malvern Instruments, Malvern, UK), the size distribution and ζ-potential of vesicles were measured at a 173° scattering angle, as recommended by the manufacturer for particles in the 0.3-10,000-nm size range. The sample's viscosity was assumed to be equal to water. The measurements were interpreted by setting the solution's refractive index to 1.33 and 1.35 for EVs. Samples were analyzed in five repeats, each including 12 light scattering measurements. The scattering data were processed assuming a general-purpose model implemented in the Zetasizer software, which estimated EVs' ζ-potential, size distribution, mean, and standard deviations.

The expression of EV biomarkers, calnexin, UMOD, and lipoproteins were assessed by Western blotting. Samples were separated on SDS-PAGE gel (4561103, Bio-Rad, Hercules, CA, USA) and electro-transferred to nitrocellulose membranes (Bio-Rad, 1704158) using Trans-Blot Turbo System (17001917, Bio-Rad). Nonspecific sites were eliminated by washing the membranes with PBS and incubating overnight at 4° C. with a blocking buffer (Thermo Fisher, 37572). Primary antibodies for CD9, CD63, EpCAM, Calnexin, Apolipoproteins A1 and B, and UMOD (respectively, BioLegend, 312102 and 353013; LSBio, B6014; Abcam, ab223582; RAH Laa and RAH Lbb, IMTEK, Moscow, Russian Federation; PAG918Hu01, Cloud-clone, Houston, TX, USA) were diluted 1:5000 in blocking buffer and incubated overnight at 4° C. with separate membranes inside a gentle shaker. After four 10-min washes with 0.05% PBS-Tween 20 (PBST) solution to remove unreacted antibodies, membranes were incubated at room temperature for 2 h in PBST-0.1% BSA solution of peroxidase-labelled secondary antibodies (P-SAR and P-GAM Iss, IMTEK) diluted 1:5000. The incubated blots were washed (four times with PBST and then again twice with PBS; each wash was 10-min long) and developed using the ClarityWestern ECL substrate (Bio-Rad, 170-5060). Precision Plus Protein Western C standard (Bio-Rad, 161-0376) was used for band identification. Immunoreactive bands were visualized with ChemiDoc XRS Imaging System (Bio-Rad, 1708070).

Gel electrophoresis was performed in 10% PAAG using a Bio-Rad electrophoresis system to assess the abundance of human serum albumin in preparations. The transfer of proteins to the Trans-Blot Transfer Media nitrocellulose membrane (Bio-Rad) was carried out using a SemiDry Transfer Cell device (Bio-Rad). The membrane was blocked with 5% milk powder, washed in Tris buffer three times, and stained while shaking for 1 h by mouse antihuman albumin (Hy Test, Moscow, Russian Federation) diluted 1:1000. Human serum albumin (Sigma-Aldrich, St. Louis, MO, USA) was used as a control. The protein ladder standard was provided by a pre-stained PageRuler Ladder (Thermo Fisher). After incubation, the membrane was washed three times with Tris buffer and incubated for 1 h with anti-mouse antibodies conjugated with horseradish peroxidase (Santa Cruz Biotechnology, Dallas, TX, USA). After washing the membrane, the proteins were developed with a DAB/NiCl$_2$ solution. The images were acquired using Gel Doc EZ Imager (Bio-Rad).

Protein abundance was also quantified by UV-Vis absorbance using Nanodrop 2000c (Thermo Fisher) following the A280 Method. The characterization was performed using 1.5 μl of undiluted samples, repeated four times, and averaged.

The expression of CD9 and CD63 in all types of examined EV samples (human blood plasma, human urine, and hMMSC culture medium) was established using the Exo-Fluorescence-activated Cell Sorting (FACS) kit (HBM-FACS-C, HansaBioMed). Briefly, EVs were first nonspecifically adsorbed on the surface of large (4-μm diameter) Aldehyde/Sulphate latex beads by co-incubation. Un-adsorbed EVs were removed by repeating twice a sequence of bead pelleting by centrifugation, discarding the supernatant, and re-suspending the pellet in the fresh buffer supplied with the kit. EVs adsorbed on the beads were then stained for CD9 or CD63 using Abcam ab58989 or ab271286 primary antibodies diluted 1:200 before use. Unreacted Abs were removed by discarding the supernatant after pelleting the labelled bead-EV complexes. A secondary label, reactive with the primary antibodies and conjugated to Alexa Fluor 488 fluorescent dye (ab150113, Abcam), was added after 1:1000 dilution and incubated at 4° C. for 1 h with EVs adsorbed on the surface of latex beads and already labelled with primary Abs for CD9 or CD63 biomarkers. Each sample was washed by centrifugation pelleting in the washing buffer (4000×g for 5 min), discarding the supernatant, and refreshing the washing buffer provided with the kit. The prepared samples were analyzed by S3 Cell Sorter (BioRad). The data analysis (FlowJo software, BD Life Sciences, Ashland, OR, USA) showed at least 20,000 reads in the FL1 channel for each sample. For confirmation, the results were replicated for each EV sample, and the entire workflow was validated by applying it to plasma EVs supplied with the kit.

As part of the study directly comparing the performance of the asymmetric depth filtration with EV isolation by SEC and UC, the presence of CD81 and reconfirmation of CD9 and CD63 expressions in plasma EVs were performed by screening for epitopes on the surface of exosomes. Briefly, CD9-PE, CD63-APC, and CD81-FITC antibodies (130-103-955, 130-127-492, and 130-107-981; Miltenyi Biotec, Germany) were added to EVs in filtered PEB (PBS plus 5mMEDTA plus 0.5% BSA), incubated for 60 min at 4° C. in a rotator protected from light, and then diluted 1:10 in PEB. MACS Quant Analyzer (Miltenyi Biotec) counted the labelled vesicles. Filtered PEB was run to assess the background noise. Auto-fluorescence of EVs was evaluated by measuring the unstained EV samples.

Protein quantification using Micro BCA protein assay (Pierce BCA Protein Assay Kit, Sigma-Aldrich) followed the manufacturer's instructions. In short, EV samples were diluted in DI water (1:1 ratio), and 150 μl of the solution was incubated for 2 h at 35° C. with an equal reagent volume. Absorbance was then measured at 562 nm using a CLARIOSTAR plate reader (BMG Labtech, Germany).

The Raman analysis of plasma EVs was performed using a spectrometer (Horiba LabRam EvolutionHR, Horiba Ltd., Irvine, CA, USA) equipped with Olympus MPlan 50× objective and 600 lines/mm grating. Raman scattering was excited by a 633-nm laser adjusted to 50% of its maximum power. A small drop (~1 μl) of a plasma EV sample was pipetted on a fused quartz surface and dried at room temperature. The analyte concentration was increased by placing the second drop in the exact location and drying. Three spectra were accumulated with a 50-s exposure and averaged. The Raman spectra of the clean area of quartz glass and the dried solution of human serum albumin (0.4 g/mL; Octapharma Pharmazeutika Produktionsgesellschaft m.b.H., Austria) were used as controls.

Applicant used mass spectrometry and proteomic analysis to quantify the purity of EV isolations obtained by asymmetric depth filtration. Hydrolytic digestion of proteins was carried out following FASP (Filter-Aided Sample Preparation) protocol, which was modified to use 10 kDa NMWCO centrifuge filters (YM-10 Microcon filter, MilliporeSigma). Disulphide protein bonds were restored and alkylated by 30 min incubation with 4 mM Tris (2-carboxyethyl) phosphine (TCEP) and 6.2 mM 2-chloroacetamide (CAA) at 80.0 in samples containing 50 μg of protein. The reacted samples were concentrated by using YM-10 centrifuge filters subjected to 11,000×g for 15 min inside a thermostatically controlled rotor maintained at 20° C. Concentrated samples were washed three times by adding 200 mL of buffer containing 50 mM triethylammoniumbicarbonate (TEAB, pH=8.5) and re-concentrated in YM-10 devices (11,000×g for 15 min at 20° C.) after each wash. Washed and concentrated samples were suspended in TEAB containing trypsin (Promega, Madison, WI, USA; 1:50 ratio of trypsin to total protein concentration) and incubated overnight at 37° C. while shaking at 350 rpm. Peptides were separated from the reaction buffer by 11,000×g thermostatically controlled centrifugation (YM-10 filters) for 15 min, washed with 50 mL of a 30% formic acid, and filtered. The filtrate was dried in a vacuum concentrator and dissolved in 20 μl of 5% formic acid for mass spectroscopy.

1 microgram of peptide mixture was loaded in Acclaim Pepmap C18 HPLC column (Thermo Fisher) and separated by HPLC in a gradient elution mode (Ultimate 3000 RSLCnano HPLC system, Thermo Fisher). The flow rate of the mobile phase was maintained at 0.3 μl/min. The gradient was formed by mobile phases A (0.1% formic acid) and B (80% acetonitrile, 0.1% aqueous formic acid solution). After washing the column for 7 min (98% and 2% of phases A and B, respectively), the sample was injected, and the concentration of phase B increased linearly to 35% in 63 min and then to 99% in 5 min. The 99% phase B concentration was maintained for 10 min and then linearly decreased to the starting 2% concentration in 5 min.

The mass analysis of the eluted sample was performed by Q Exactive HF-X mass spectrometer (Thermo Fisher) operating with a heated electrospray ionization probe in a positive ionization mode (2.1 kV emitter voltage and 240° C. capillary temperature). Panoramic scanning between 300 m/z and 1500 m/z was performed with a resolution set to 120,000. In tandem mass spectrometry mode, the resolution was equal to 15,000 in the mass range between 100 m/z and the upper limit, which was determined automatically based on the mass of the precursor. The isolation of precursor ions was carried out in a ±1 Da window. The maximum number of ions isolated in tandem mode was set to 25, the cutoff limit for selecting a precursor set to 80,000 units, and the normalized collision energy NCE=29. Only ions with charges between z=2+ and 5+ were considered during tandem scanning. The maximum accumulation time was 50 ms for precursor ions and 100 ms for fragments. The Automatic Gain Control (AGC) value for precursors and fragment ions was set to $1 \times 10^6$ and $2 \times 10^5$, respectively. All measured precursors were dynamically excluded from tandem MS/MS analysis after 70 s. Protein speciation based on MS measurements was reconstructed in MaxQuant proteomics software (Max-Planck Institute of Biochemistry, Germany), specifying trypsin as the cleavage enzyme and allowing a cleavage site to skip two positions (Walker, 2009). Methionine oxidation and deamidation of glutamine and asparagine were allowed as possible peptide modifications. Carbamoid-methylation of cysteine was assumed to occur. Under the described conditions, the mass of monoisotopic peptides is measured with ±5 ppm accuracy, while the accuracy of masses in MS/MS spectra is equal to ±0.01 Da. The false discovery rate in validating juxtaposition (pair formation) of spectra and peptides was required to be below 1%. At least two peptides were required to validate protein identification.

Size-frequency measurements obtained by different techniques were converted into probability density functions (pdf) and visualized as histograms or distributions.

III. Results

The asymmetric DF process is illustrated in FIGS. 1a-1d. The opening pores in Surface 1 (top or entry surface—FIG. 1a) through which the biofluid enters the filtration medium have wider apertures than the diameters of EVs targeted for capture and excluded from elution. Therefore, EVs can enter and move through the pores to some degree. The EVs' translocation is kinetically controlled by their size, concentration, interactions with pore surfaces, changing pore geometry, and fluid viscosity. Tortuous and narrowing pores of the asymmetric filter (FIGS. 1a, 1e, and schematically shown in FIG. 1b) trap larger particles within the filtration medium while allowing small particles to exit the membrane.

EVs were isolated by DF from biological fluids with widely varying properties. Blood plasma is more viscous and abundant in EVs and proteins than urine (FIGS. 2a and 2b). EV and protein concentrations in the growth medium of human multipotent mesenchymal (hMM) stem cells were significantly lower than in either plasma or urine. Therefore, the sample preparation of plasma samples was adjusted to account for their higher EV and protein concentrations and viscosity. Each blood plasma sample (n=10, 200 μl sample per donor) was thawed, diluted 1:50 with PBS, and centrifuged at 4500×g for 30 min at 4° C. to remove any remaining cell debris and aggregates. The supernatant was cleared by filtration through a 0.8 μm-pore cellulose acetate (CA) filter (Nalgene syringe filter, Thermo Fisher) and transferred into the DF cartridge. The EV isolation from one of the plasma samples was performed in five technical replications to confirm repeatability.

Urine samples from each donor (n=5, 10 mL each) were centrifuged without dilution at 4500×g for 30 min at 4° C. The supernatant was transferred into the DF cartridge without 0.8-μm pre-filtration, and EVs were isolated from each sample.

For hMMSCs, the undiluted culture medium (~40 mL) was centrifuged for 10 min at 200×g to remove the remaining MMSC cells and another 30 min at 4500×g to remove cell debris. The cleared medium was then filtered through a 0.2 μm filter and transferred for EV isolation by depth filtration. The process was repeated for five media samples obtained after separately culturing MMSCs collected from umbilical cords of five donors (n=5).

The abundance of vesicles relative to the protein concentration characterizes the purity of EV isolations. By this metric, the depth filtration isolated EVs with consistently high purity for all examined biofluid types, on average equal to ~$1.1\pm0.2\times10^{10}$ vesicles per microgram of proteins (FIG. 2c).

Hydrodynamic diameters of the isolated EVs were predominantly in the exosomal/small EVs range (see the size distributions for a subset of samples in FIG. 2d and the complete summary of NTA sizing results in Table 1; DLS sizing results are summarized in Table 2).

TABLE 1

NTA measurements of hydrodynamic diameters (nm; mean ± standard deviation based on five technical repeats) of EVs isolated by DF from plasma, urine, and cell culture media.

|  | Plasma | Urine | Cell culture |
|---|---|---|---|
| Sample 1 | 109 ± 34 | 106 ± 17 | 94 ± 25 |
| Sample 2 | 106 ± 21 | 104 ± 27 | 109 ± 37 |
| Sample 3 | 115 ± 22 | 102 ± 47 | 114 ± 56 |
| Sample 4 | 130 ± 38 | 120 ± 54 | 109 ± 58 |
| Sample 5 | 120 ± 61 | 117 ± 58 | 105 ± 81 |
| Sample 6 | 130 ± 52 | — | — |
| Sample 7 | 104 ± 84 | — | — |
| Sample 8 | 106 ± 36 | — | — |
| Sample 9 | 109 ± 47 | — | — |
| Sample 10 | 101 ± 40 | — | — |

TABLE 2

DLS measurements of the mean hydrodynamic diameter (mean of five repeats ± the standard deviation, STD) and ζ-potential (three repeats ± STD) of plasma EVs isolated by different methods.

| Repeats | Mean (nm) | ζ-potential (mV) |
|---|---|---|
| Depth-filtration | 97 ± 1 | −12.4 ± 0.5 |
| Ultracentrifugation | 115 ± 6 | −11.3 ± 0.8 |
| Size-exclusion chromatography | 115 ± 9 | −10.8 ± 0.4 |

The electron microscopy examination of EVs isolated from different biofluid types (SEM images of two different samples for each biofluid are seen in FIG. 2e) revealed the expected size and morphology of the DF-isolated vesicles. Similar EV size and morphology were observed directly on Surface 1 (the top or entry surface) and inside the pores of the DF membrane (see FIGS. 3a-3e) for plasma EVs, which were purchased as a positive control from HansaBioMed (supplied in purified and lyophilized form, which were suspended in a buffer following manufacturer's instructions) and recaptured by DF.

FACS results in FIG. 2f show the positive expressions of two canonical EV biomarkers, CD9 and CD63, for the EVs in all biofluids. The biological variability is apparent when comparing EV concentrations and biomarker expressions in samples of the same biofluid type. In each case, the FACS counts positively correlate with EV concentrations. For instance, weak CD63 expression in the second plasma sample, independently confirmed by immunoblotting (FIG. 3f), is commensurate with lower EV abundance ($0.3\pm0.02\times10^{11}$ #/mL in the second sample vs. $5.3\pm0.4\times10^{11}$ #/mL in the first (see FIG. 2d). Beyond variations in the concentration, EVs exhibit molecular heterogeneity, apparent from the binding of immunogold labels to a subset of vesicles (see FIG. 5e). Such biological heterogeneity likely contributes to the observed differences between the samples.

HPLC-MS proteomic analysis of DF-isolated plasma EVs was performed in three technical repeats for one pEV sample, and 165 proteins were identified in the preparation. The expression of the twenty most abundant proteins is shown in FIG. 4a. The top twenty EV-specific proteins and the parent cells that express them are listed in Table 3.

TABLE 3

The twenty most abundant proteins in plasma EV were identified by mass spectroscopy Apolipoproteins and albumin are excluded.

| UniProt Accession | UniProt ID | Species | Protein name | Expression |
|---|---|---|---|---|
| P01871 | IGHM | HUMAN | Immunoglobulin heavy constant mu | B lymphocytes |
| P00738 | HPT | HUMAN | Haptoglobin | Liver |
| P01023 | A2MG | HUMAN | Alpha-2-macroglobulin | Lung, urinary bladder, gall bladder, liver |
| P0DOX7 | IGK | HUMAN | Immunoglobulin kappa light chain | B lymphocytes |
| P02679 | FIBG | HUMAN | Fibrinogen gamma chain | Liver |
| P02675 | FIBB | HUMAN | Fibrinogen beta chain | Liver |
| P01876 | IGHA1 | HUMAN | Immunoglobulin heavy constant alpha 1 | B lymphocytes |
| P02671 | FIBA | HUMAN | Fibrinogen alpha chain | Liver |
| P01859 | IGHG2 | HUMAN | Immunoglobulin heavy constant gamma 2 | B lymphocytes |
| P02747 | C1QC | HUMAN | Complement C1q subcomponent subunit C | Spleen, lymph node, lung |
| P69905 | HBA | HUMAN | Hemoglobin subunit alpha | Heart, spleen, liver |
| P04003 | C4BPA | HUMAN | C4b-binding protein alpha chain | Liver, lung, bone marrow |
| P04264 | K2C1 | HUMAN | Keratin, type II cytoskeletal 1 | Skin |
| P01619 | KV320 | HUMAN | Immunoglobulin kappa variable 3-20 | B lymphocytes |
| P02746 | C1QB | HUMAN | Complement C1q subcomponent subunit B | Spleen, lymph node, liver |
| P02787 | TRFE | HUMAN | Serotransferrin | Liver, nervous system, heart |
| P01024 | CO3 | HUMAN | Complement C3 | Liver, gall bladder |
| B9A064 | IGLL5 | HUMAN | Immunoglobulin lambda-like polypeptide 5 | Heart, blood, bone marrow |

TABLE 3-continued

The twenty most abundant proteins in plasma EV were identified
by mass spectroscopy Apolipoproteins and albumin are excluded.

| UniProt Accession | UniProt ID | Species | Protein name | Expression |
|---|---|---|---|---|
| P13645 | K1C10 | HUMAN | Keratin, type I cytoskeletal 10 | Skin |
| P02751 | FINC | HUMAN | Fibronectin | Placenta, liver, lung |

The relative protein abundance is reported as the intensity-based absolute quantification (iBAQ) and the relative iBAQ value (riBAQ) normalized by the total protein abundance. The calculated riBAQ is equivalent to the normalized molar intensity. Both iBAQ and riBAQ values were obtained using the MaxQuant quantitative proteomics software package.

The presence of contaminating lipid particles of high, low, and very low densities (HDL, LDL, and VLDL), known to collectively exceed the number of EVs in plasma by at least five orders of magnitude, was assessed by the relative expressions of lipoproteins in DF-isolated EV preparations. The mass spectroscopy identified nine apolipoproteins that bind lipids to form lipoprotein particles. Their relative MS intensity is reported in FIG. 4b. The combined contribution of apolipoproteins is only 7.7% of the total protein content, indicating better than $\times 10^6$ enrichment of EVs achieved by depth filtration relative to lipid particles. This estimate was obtained assuming a linear relationship between the protein concentration and the number of extracellular particles (see FIG. 2a).

Another common contaminant of plasma EVs is serum albumin, the most abundant protein in the blood. riBAQ data indicates a 7.2% contribution of albumin to the total amount of proteins in EV preparations obtained by DF. Immunoblotting confirmed the high purity of DF isolations quantified by mass spectroscopy. Western blots of three distinct plasma EV isolations (pEV1 . . . 3, FIG. 4c) show an essentially complete clearance of apolipoproteins A1 and B by depth filtration compared to their initial expression in source plasma (P1 . . . 3).

Unlike plasma, the urine of healthy individuals contains minimal amounts of lipids. Therefore, the purity of uEV preparations isolated by DF was assessed by the presence of Uromodulin (UMOD), the most abundant urine protein. The Western blot for three isolations of urinary EVs (uEV1 . . . 3, FIG. 4d) shows thorough depletion of UMOD, expressed abundantly in the source biofluid (U1 . . . 3).

The absence of cell debris in EV isolations (cEV1 . . . e3) from the culture medium of hMM stem cells (CM1 . . . 3 are the media from three independent growth experiments seeded with cells isolated from different umbilical cords) was confirmed by low Calnexin expression (see FIGS. 4e and 4f).

Human plasma sample P1 was used in a head-to-head comparison of EV purity and yield obtained by depth filtration, ultracentrifugation, and size-exclusion chromatography.

The vesicles' hydrodynamic size distributions in pEV1 preparation were measured by NTA (FIGS. 5a and 5h) and DLS (FIG. 5i). The mean hydrodynamic diameters of these distributions were 109±2 nm (Table 5) and 97±1 nm (Table 2) for the two methods. The surface charge of extracellular vesicles was characterized by their ζ-potential, equal to −12.4±0.5 mV for the DF isolation and similar for other methods (Table 2). The concentration of EVs isolated by DF varied between $2\times10^{11}$ and $3\times10^{11}$ particles/mL in five aliquots of the same P1 sample (FIG. 5b, Table 4).

TABLE 4

NTA concentration measurements for five aliquots of
plasma EVs isolated by different methods (#/mL).

| Repeats | DF | UC | SEC |
|---|---|---|---|
| Run 1 | 2.90E+11 ± 1.80E+10 | 3.79E+11 ± 9.30E+09 | 8.95E+10 ± 3.08E+09 |
| Run 2 | 2.72E+11 ± 1.79E+10 | 3.39E+11 ± 9.10E+09 | 1.40E+11 ± 2.61E+09 |
| Run 3 | 3.01E+11 ± 3.16E+10 | 4.16E+11 ± 1.30E+10 | 1.07E+11 ± 3.47E+09 |
| Run 4 | 2.64E+11 ± 4.06E+10 | 4.70E+11 ± 6.85E+09 | 1.18E+11 ± 1.06E+10 |
| Run 5 | 2.56E+11 ± 3.85E+10 | 5.14E+11 ± 1.05E+10 | 7.90E+10 ± 5.51E+09 |

The morphology and the size of EV membranes were assessed by SEM. FIG. 5e shows the expected rounded shape of desiccated vesicles and the geometric size of membrane bilayer envelopes smaller than their hydrodynamic diameter (FIG. 5j). The positive expression of CD9, CD63, and EpCAM biomarkers, revealed in SEM images by immune-labelled gold nanoparticles appearing as bright spots on EV membranes, is seen in FIG. 5e.

The protein concentration measured by the BCA assay was between 21 and 29 μg/mL for the DF isolation in the five experimental repeats (Table 5), which puts the EV-to-proteins ratio, often used to characterize the purity of EV isolations, between $1.1\times10^{10}$ and $1.4\times10^{10}$ vesicles per microgram of proteins for the developed method (see FIG. 5d).

TABLE 5

Mode, mean, and median hydrodynamic diameters (nm) of
plasma EVs (plus-minus standard error, STE) measured
by NTA and protein concentration (μg/mL) determined
by BCA for five repeated EV isolations by different methods.

| EV isolation method | NTA | | | BCA |
|---|---|---|---|---|
| | Mode ± STE | Mean ± STE | Median ± STE | Mean ± STE |
| DF | 83 ± 3 | 109 ± 2 | 95 ± 2 | 22.7 ± 2.3 |
| UC | 88 ± 5 | 101 ± 4 | 91 ± 2 | 70.7 ± 1.3 |
| SEC | 77 ± 3 | 108 ± 4 | 92 ± 4 | 9.5 ± 0.2 |

Western blotting (see FIG. 5f) and flow cytometry (FIG. 5g) show that EVs express exosomal biomarkers, CD63, EpCAM, and, to a lesser extent, CD9. The most abundant plasma protein, albumin, was undetectable in blots (see FIG. 5f), though present at low expression according to a more sensitive and quantitative MS/MS (ALBU in FIG. 4a). Therefore, we conclude that DF isolation effectively eliminates solubilized plasma proteins from the isolated EVs and significantly depletes lipid particles, as demonstrated by apolipoproteins' low iBAQ values (see FIG. 4b). Calnexin, an endoplasmic reticulum integral protein, was not expressed in blots (see FIG. 5f), indicating cell debris does not contaminate DF-isolated EVs.

Raman spectrum of plasma EVs isolated by DF (see FIG. 5k) contains the expected peaks identified in Table 6. Specifically, the peak at 1004 $cm^{-1}$ corresponds to aromatic ring stretching in phenylalanine. The spectral region between 1200 and 1300 $cm^{-1}$ corresponds to amide III bands, and the peak at 832 $cm^{-1}$ is due to out-of-plane ring breathing in tyrosine. The presence of cholesterol (peak near 704 $cm^{-1}$) and lipids (peak at 1440 $cm^{-1}$, corresponding to $CH_2$ bending in lipids and cholesterol) reveals membrane constituents of EVs.

TABLE 6

Raman peaks in EV spectra in FIG. 5k.

| Raman shift, $cm^{-1}$ | Assumed assignment |
|---|---|
| 622 | Phenylalanine (phenyl ring breathing) |
| 644 | Tyrosine (C-C twisting) |
| 704 | Cholesterol and cholesterol esters |
| 759 | Tryptophan |
| 832 | Tyrosine (out of plane ring breathing) |
| 854 | Tyrosine (ring breathing mode); proline (C-C ring stretch) |
| 880 | Tryptophan; in-plane rocking ($CH_2$), e.g., protein |
| 959 | Cholesterol |
| 1004 | Phenylalanine, C-C aromatic ring stretching |
| 1032 | $CH_2CH_3$ bending (e.g., phospholipid); C-C vibration (e.g., polysaccharide) |
| 1129 | Lipids and proteins |
| 1208 | Phenylalanine, tryptophan (C-$C_6H_5$ stretching) |
| 1200-1300 | Amide III in proteins |
| 1440-1450 | Lipids $CH_2$ deformation at 1437; lipids and proteins $CH_2/CH_3$ deformation at 1443; protein $CH_2$ bending mode at 1446 |

For comparison, standard UC protocols were followed for EV isolation by ultracentrifugation. The particle sedimentation by centrifugal forces depends on the particle size, buoyant density, and viscosity of the solution. The sample's viscosity was reduced by diluting plasma with PBS (1:5 ratio) to improve the sedimentation efficiency. Any remaining cells, cell debris, apoptotic bodies, large micro-vesicles, and aggregates were pelleted and discarded by a two-step conventional centrifugation at 4500×g and then at 12,000×g. The supernatant was then ultracentrifuged at 100,000×g to pellet EVs. The background protein contamination was reduced by re-suspending the pellet in PBS and re-pelleted EVs by the second round of ultracentrifugation at 100,000×g. The second pellet was re-suspended in 1 mL of PBS and saved for analysis.

The yield of EVs isolated by UC per mL of plasma was almost an order of magnitude lower as compared to isolation by DF (see FIG. 5c). The distribution of hydrodynamic sizes (FIG. 5a and Table 5) was not significantly different. The ζ-potential was equal to −11.3±0.8 mV, a value comparable to the electrokinetic potential of DF-isolated vesicles. The EV biomarkers (see FIG. 5f) were less expressed than in EVs isolated by depth filtration, while the total protein concentration was higher (see Table 5). The purity of UC samples, quantified as the number of vesicles per microgram of proteins, was lower than $1\times10^{10}$ particles/μg (see FIG. 5d). The Western blot in FIG. 5f indicates the presence of albumin, although, in a low amount, likely contributing to a higher protein concentration in the UC isolation. Albumin was undetectable in Western blots of DF and SEC preparations.

Commercially available SEC columns were used to isolate EVs from 500 μl aliquots of plasma for comparison. As the sample flows through a gel packed column containing porous resin beads, the propagation paths of particles are size-dependent. Proteins, other molecules, aggregates, and small lipid particles migrate through the pores that retard their translocation. Larger particles, such as EVs, cannot enter the pores and migrate through the gel filling the volume unoccupied by beads, and elute first. This fractionation mechanism separates the molecular and particulate content of the sample into fractions eluting at different times.

Elution fractions were collected every 30 s, with the first elution interval (Fraction 1, F1) starting from the time when the column is loaded with 500 μl of the plasma sample. NTA measurements were used to determine when to collect EV-containing fractions. It was found that particles with hydrodynamic diameters between 90 and 100 nm were predominantly eluted during 30-s intervals 7, 8, and 9 (F7 . . . 9, FIG. 5l). These fractions were pooled and used as the SEC-isolated EV preparation. Fraction 10 contained EVs at a lower abundance relative to protein concentration (less than $1\times10^{10}$ particles/μg of protein) and overlapped with the protein elution time (see FIG. 5l). Later-eluting fractions contained higher protein concentrations (see FIG. 5m) and small particles (mean hydrodynamic diameter between 50 and 60 nm).

EV concentration in pooled fractions F7 . . . 9 was between $0.8\times10^{11}$ and $1.4\times10^{11}$ particles/mL (FIG. 5b, Table 4), or ∼3 times lower than the concentration obtained by DF. Mean hydrodynamic particle diameters measured by DLS (115±9 nm) and NTA (108±4 nm) were consistent with DF and UC isolations. The ζ-potential was −10.8±0.4 mV, close to the values obtained for EVs isolated by alternative methods. Co-isolated proteins in pooled fractions F7-9, measured by BCA protein assay to be 9.5±0.2 μg/mL, were lower in concentration than in UC-isolated samples (see FIG. 5d). After the normalization with the concentration of the isolated EVs, the abundance of co-isolated proteins was low. On average, a microgram of protein was found in a volume containing $1.1\times10^{10}\pm2.5\times10^{9}$ EVs, which is slightly worse than in DF-isolated EVs; however, the variability between the five SEC repetitions with different aliquots was more significant than in the DF isolations, which were very consistent, as shown in FIG. 5d. Calnexin and albumin (non-EV proteins) were not observed in Western blots for EV preparations isolated by SEC or DF (see FIG. 5f).

IV. Discussion

EV isolation methods continue to evolve to provide new and improved options to increase the yield and reduce contamination. The maximum possible EV yield is tantamount to unbiased isolation without favoring specific EV subpopulations, which is important in understanding the impact of biophysical and biochemical heterogeneities on signaling, therapies, and diagnostic applications of EVs. Equally important, the purity of isolations eliminates the potential interference of non-EV components found in biofluids that may alter outcomes.

The goals of isolating EVs from complex biological sources with high yield and low contamination are difficult to achieve simultaneously. Previously proposed solutions usually require multiple processing steps to isolate EVs without bias and then purify the obtained preparation by depleting co-isolated contaminants. For example, the recently proposed three-step isolation sequence of Zhang et al., 2020 starts with high-yield EV precipitation from the source fluid, followed by purification steps that include ultracentrifugation and size exclusion chromatography. The combined sequence is lengthy (requires overnight incubation and 16 h gradient density centrifugation under unusually high forces) and is not scalable.

Disclosed herein is a novel asymmetric depth filter approach for the isolation of EVs from plasma or other biological fluids with yields and purity that exceed multistep methods, such as the one developed by Zhang et al. (2020). Isolation by asymmetric depth filtration is a very simple, essentially single-step method that immobilizes EVs from a source biofluid in asymmetric pores, rinses them with washing buffer to deplete contaminants, and then recovers retained EVs by flowing a re-suspending buffer or other suitable carrier fluid in the reverse direction.

Unlike conventional surface filtration, depth filtration captures the product (EVs) within the filter, recovers it with applied reverse flow, and elutes impurities into the permeate or permanently immobilizes them within the filter. To isolate EVs, Applicant uses tortuous and narrowing anisotropic pores (see FIGS. 1a and 1e). Such pores stop the motion of EVs entrained within a forward flow of a source biofluid within the filtration medium while allowing solubilized constituents and small biological nanoparticles (e.g., HDL, small LDL, and small protein agglomerates in plasma) to exit the membrane (see FIG. 1b). Reversible protein agglomerates overlapping in size with EVs (e.g., about 100 nm in hydrodynamic diameter) that are retained by the filter, are eliminated by dissociation during wash cycles, aided by high-shear convection of washing buffer inside the pores. Large plasma particles are eliminated from DF isolations during sample preparation (e.g., low-speed centrifugation followed by straining larger than 0.8 µm particles by surface filtration).

LDL and VLDL lipoprotein particles in the range of EV sizes are extremely soft and flexible (softer and more flexible than the EVs). They deform easily to squeeze into narrowing pores and are forced deep into the asymmetric filter by the forward flow of diluted plasma and eventually either elute as a permeate or lodge permanently within the pores (e.g., they are not dislodged, even after flow reversal, which releases the lightly and releasably entrapped EVs).

Irreversible protein agglomerates with higher than EV elasticity are likely excluded from the DF preparations of pEVs by the same forced elution and trapping mechanisms. Therefore, out of the diversity of protein aggregates in plasma characterized by different sizes, morphology, and structure, only those that are irreversible, relatively rigid, and in the range of EV sizes likely to contaminate pEV isolations by asymmetric DF. Such isolable stiff protein particles are often associated with diseases (e.g., amyloids in type 2 diabetes and neurodegenerative disorders) and, therefore, should be substantially absent in plasma samples of healthy donors.

The transit of small lipid particles and solubilized milieu through the depth filter, the forced elution after deformation or trapping of large soft particles (including VLDL and protein agglomerates) within the filtration medium, flushing of residual contaminants from pore surfaces with low protein binding, and dissolving reversible agglomerates during wash cycles are the likely mechanisms behind unprecedented purity of EV isolations obtained by asymmetric depth filtration from plasma, which is one of the most challenging fluids for isolating EV with high purity.

To emphasize the advantages, asymmetric depth filtration was compared with conventional surface filtration. The pore asymmetry employed in DF explains the success of the developed DF method in isolating EVs with high purity and yield from complex biofluids where conventional surface filtration fails. For comparison, Applicant attempted the isolation of plasma EVs by single-step surface filtration, to highlight the differences relative to the presently described method. Sample preparation steps were the same as for depth filtration. Briefly, plasma was diluted in PBS 1:50, centrifuged at 4500×g for 30 min at 4° C., and the supernatant was filtered through a 0.8 µm filter. The prepared sample was forced through a 100 kDa MWCO filter (Amicon, MilliporeSigma) by 3500×g centrifugation to isolate EVs. It was found that this surface filter clogs quickly, after which continued centrifugation did not reduce the volume of the remaining sample that had not yet passed through the filter, indicating failed isolation. Conversely, asymmetric pores with entrance apertures larger than EVs maintain flow connectivity, allowing solubilized content and small particles in the plasma to elute even when a significantly lower driving force (e.g., less than 1000×g, such as 700×g) is used.

The selection of DF filtration medium contributed to the high yield and purity of EV isolations achieved by the developed method. Cellulose acetate (CA) membranes with asymmetric depth filter pore characteristics may be particularly suitable, as CA has one of the lowest protein bindings, partly due to its negative surface charge. Other biomolecules and particles with a negative $\zeta$-potential at physiological conditions are impeded from nonspecific adsorption to CA. As a result, proteins, small (e.g., lipid) particles, and membrane fragments do not bind to pore surfaces and are easily removed from the filtration medium by forward flow during EV washing. The negative surface charge of the filtration medium also prevents the adsorption of surface-active EVs, known to have a negative $\zeta$-potential at neutral acidity, as confirmed by Applicant. This low affinity of EVs to CA surfaces contributes to their efficient recovery by the reverse flow and the high yield of DF isolations. Filter materials other than CA having similar characteristics may also be suitable for use. Such alternative materials may include, but are not limited to regenerated cellulose, polyether sulfone, and aramid.

Low surface binding enhances the removal of contaminants by washing captured EVs and contributes to the high purity of preparations. The ability to use the same DF device to both capture and clean EVs streamlines and simplifies the process. The ability to delay recovery of EVs from DF medium is a new method to store EVs and deliver them as they are needed, just-in-time resuspending with the reverse flow, or therapeutic delivery to the treatment site directly from the DF filter applied as a patch.

Western blots in FIG. 5o illustrate the decrease in apolipoprotein content of plasma EV preparations with repeated washes. FIG. 5t shows the reduction in albumin contamination of captured but unwashed pEVs (DF-0) after they are subjected to a single wash (DF-1) and repeated washes (DF-2 lane is for twice and DF-3 for trice-washed EV captures). It was found that use of two washes strikes a balance between purity and EV yield for all examined biofluids (e.g., note the reduction in UMOD expression after the second wash of urine EVs, in FIG. 5u). Of course, one may perform fewer washes when a higher yield is desired (e.g., FIG. 3b illustrates that some EVs are lost into permeate with each wash). Alternatively, more than two wash cycles may be performed when a deeper depletion of background contaminants is desired.

The performance of asymmetric depth filtration was assessed by the yield and purity of EVs isolated from three biological fluids—plasma, urine, and cell growth medium.

The yield of plasma EVs for ten donor samples (see FIGS. 2a and 2b), replicated five times for one of the samples (FIG. 5c), was between ~$6\times10^{10}$ and $1\times10^{12}$ vesicles per mL of plasma. It was estimated that only ~0.16% of original plasma apolipoprotein A1 and ~0.07% of apolipoprotein B remain in such EV preparations, indicating a dramatic depletion of lipid particles by DF (i.e., 99.84% and 99.93% respectively). Such depletions of greater than 99%, or greater than 99.5% are remarkable. These purity quantifications are based on reported concentrations of apolipoprotein A1 and B in human plasma of 1.4 and 1.1 mg/mL, respectively, ~52 µg/mL total protein concentration in DF-isolated EV preparations measured by BCA (Table 5), and the relative abundance of lipoproteins determined by proteomic analysis (4.23% and 1.50% for APOA1 and APOB, FIG. 4b). Similarly, the reduction in albumin from ~42 mg/mL in plasma down to 7.22% (riBAQ value) of 52 µg/mL estimates the depletion of the solubilized background by depth filtration down to 0.009% of the original plasma milieu remaining in EV preparations. Apolipoproteins, which quantify contamination by lipid particles, and albumin (the primary solubilized contaminant) contribute similarly to the protein content of isolated pEVs (7.7% and 7.22% riBAQ values, respectively). Semi-quantitative immunoblotting analysis (FIGS. 4c and 5f) is consistent with this MS-based observation.

The analysis of urine EVs and EVs secreted by cultured primary human multipotent MSCs obtained from Wharton's jelly show negligible contamination by UMOD and Calnexin, respectively.

Overall, protein contamination of EV preparations obtained by asymmetric depth filtration was low across all examined biofluids (see FIGS. 4c, 4d, and 4e). The ability to isolate EVs with consistently high yield irrespective of source while depleting the preparations from the most typical contaminants demonstrates the universality of asymmetric depth filtration in isolating extracellular vesicles from biological fluids.

The purity of DF isolations were compared with that provided by the state-of-the-art three-step isolation-purification sequence of Zhang et al. (2020). The three-step method produced plasma EV preparations containing approximately 10% of lipid particles according to cryo-TEM image analysis. The mass spectroscopy identified 14 distinct apolipoproteins contributing to lipid contamination, while only nine apolipoproteins were present in DF-isolated preparation (see FIG. 4b and Table 7).

contribution is significantly lower than the 28% reported in (Zhang et al., 2020), which leads Applicant to conclude that the present single-step DF method is more efficient at eliminating lipid particles from plasma EV preparation than the lengthy multistep isolation-purification sequence of Zhang et al.

Given ~$8\times10^{16}$ lipid particles of all types are present in 1 mL of plasma and conservatively assuming the depth filtration depletes them down to the same 10% contamination as in the three-step protocol (or ~$6\times10^{10}$ lipid particles per mL based on the average yield of pEVs reported in FIGS. 2a-2f), the developed method depletes lipid particles in EV preparations by at least $\times10^{6}$ compared to their abundance in plasma.

Applicant directly compared the asymmetric depth filtration method against two EV isolation methods in wide use, UC and SEC. The EV per mL yield of human plasma was significantly higher in isolations by depth filtration (see FIG. 5c), indicating it captures the least biased and the most representative EV population out of examined methods. EV biomarkers (CD63, CD81, CD9, and EpCAM, see FIGS. 5e and 5f) were most expressed in DF-isolated samples, while the contamination by plasma proteins and membrane debris, respectively, indicated by HSA and Calnexin expressions, was the lowest (see FIG. 5f).

Applicant used two types of synthetic nanoparticles to demonstrate the size selectivity of the depth filter used in the present disclosure. The first sample was a suspension of rigid 100-nm NIST-traceable size-standard polystyrene (latex) beads (Polysciences, Inc., Warrington, PA, USA; the size distribution measured by NTA is shown in FIG. 6d) diluted in PBS to $1\times10^{11}$ particles/mL. Latex beads have a negative ζ-potential, and the selected size is close to the mean diameter of plasma EVs (Table 5). The suspending buffer, void of a complex molecular milieu of plasma, easily transits the filter. Applicant therefore modified the protocol for capturing latex beads from the PBS, as shown in FIG. 6c. Specifically, lower forces (400×g) and shorter (7-8 min) centrifugation times were used, which were sufficient to drive the entire 3.75 mL of the sample through the filter.

FIG. 6e shows that only a small fraction of 100-nm beads (less than 1%) transited through the filter with the permeate. Approximately 88% of particles in the source fluid were recovered after 2 mL of PBS was repeatedly pipetted on and aspirated off the entry surface of the filter (Surface 1). Particles recovered by aspiration were likely retained near pore entrances and on the membrane's entry surface. In fact,

TABLE 7

Apolipoproteins in EV preparations of Zhang et al. (2020) (three-step protocol) and by depth filtration.

| | APOB | APOA1 | APOA2 | APOC3 | APOE | APOA4 | APOC1 | APOA | APOC4 | APOD | APOA5 | APOL1 | APOF | APOM |
|---|---|---|---|---|---|---|---|---|---|---|---|---|---|---|
| Three-step protocol | × | × | × | × | × | × | × | × | × | × | × | × | × | × |
| Depth filtration | × | × | | | × | × | × | × | | × | × | | | × |

Although riBAQ values interpret proteomics data with higher accuracy, these values were not reported in (Zhang et al., 2020), and albumin was not included in the analysis. To obtain a fair comparison, Applicant also excluded albumin (HSA) from calculations and evaluated the percentage of apolipoproteins using MS/MS count rather than riBAQ values. In doing so, Applicant found apolipoproteins in DF samples to comprise 15% of all identified proteins (this value goes down to 14% when HSA was included). This after flowing the bead suspension through the filter, many particles are visible inside pores and on Surface 1 (the entry surface) of the membrane (see SEM image in FIG. 6a, including the inset). No particles were observed on Surface 2 (the bottom or exit surface) nor inside the exit pores of the filter (see FIG. 6b). The flow direction was reversed by changing the orientation of the filter assembly and forcing 2 mL of PBS across the membrane by 5-min centrifugation at 400×g in three repetitions. Sequentially, the reverse flow recovered 1.7%, 0.3%, and 0.1% of latex beads in the original sample, as shown in FIG. 6e. The remaining ~10% of the particles were permanently lodged within the filter and could not be re-suspended.

The second examined synthetic sample was a suspension of 20-nm gold nanoparticles functionalized with anti-mouse IgG (ab27242, Abcam) diluted in PBS to $1 \times 10^{11}$ particles/ mL. These particles have protein-decorated surfaces and were selected to test if smaller-than-EVs particles, such as HDL and small LDL lipoproteins, and solubilized proteins readily pass through the depth filter so as to not contaminate EVs recovered by the reverse flow. It was found that Au particles easily transit through the filter. Approximately 90% of them eluted with the permeate (see FIG. 6e). Very few Au particles were recovered by the reverse flow of PBS, which was imposed three times for a total of 6 mL of flowing fluid forced through the filter.

The impact of particle elasticity on their transit through the asymmetric pores of the depth filter and irreversible trapping within the filtration medium was experimentally assessed for similarly sized soft and rigid nanoparticles. As soft nanoparticles, Applicant used plasma EVs purchased in purified and lyophilized form from HansaBioMed and rehydrated following the manufacturer's instructions. Latex beads described above were used as rigid nanoparticles.

FIG. 3b shows a higher number of soft EVs transiting the filter with the flow in the forward direction. Specifically, 16.4±1.6% of vesicles have eluted the filter with the forward flow during EV recapture by DF. Additionally, 9.7±1.0% and 7.3±0.8% exited into the permeate during the first and the second washes, respectively. In contrast, less than 1% of latex beads traversed the filter with the flow in the forward direction. A comparable number of EVs and beads (~8% and 10%, respectively) were not recovered and were presumably trapped inside the filter. DF captured approximately 90% of latex beads in the original sample compared to ~60% of plasma EVs. Even with losses, the DF yield of pEVs remains much higher than with widely used isolation methods (see FIG. 5c).

Several factors likely contributed to a higher percentage of soft EVs eluting through asymmetric pores, while rigid beads did not, even where they include similar average size characteristics. First, EVs are size distributed (see FIG. 3c). A significant number are smaller than the 100-nm monodispersed beads, even though the mean diameters of EVs and beads are similar. Smaller EVs elute more readily, contributing to a higher loss. Second, the soft coronal layer surrounding the membrane envelope of EVs which contributes to their hydrodynamic diameter, can flex to allow the translation through the pores. Akin to conformational changes of flexible molecules diffusing through an extracellular matrix while rigid molecules of the same size are restricted, the flexible corona of EVs may allow their transit through the pore when rigid beads of the same hydrodynamic size are arrested.

The elasticity of the membrane of EVs' may also play a role in their ability to translocate through asymmetric pores, especially for EVs of larger sizes for which the conformation of the coronal layer alone is insufficient to elute from a pore. The increasing size of EVs eluted with repeated forward flows (see FIG. 3c) provides the strongest indication that the compliance of soft nanoparticles to the narrowing geometry of asymmetric pores aids in their transition through asymmetric pores and the elution of ever-larger particles with repeated attempts. The loss of rigid beads into the permeate remains negligible with the number of attempts to elute them (see FIG. 6e).

LDL and VLDL particles, being softer than EVs, deform more readily and are more likely to elute from the filter or travel deeper into the narrowing pores to become permanently trapped.

IV. CONCLUSIONS

The admirable performance of asymmetric depth filtration in isolating EVs may be attributed to the selective transit and capture of biological nanoparticles in asymmetric pores by size and elasticity and the ability to clean the captured EVs in situ before their recovery by the reverse flow. The developed method is believed to be the first to utilize the difference in the elasticity of biological nanoparticles to improve the purity of EV preparations. Such selectivity is achieved by a higher propensity of highly compliant particles (e.g., LDL and VLDL) to be forced through or more deeply into asymmetric pores by the forward flow during sample filtration and wash cycles. As a result, such similarly sized non-desirable contaminant particles are either eluted through the filter, or irreversibly trapped in the pores.

In summary, this report describes a novel approach to EV isolation by asymmetric depth filtration. The developed method is simple and inexpensive. It reproducibly isolates EVs with high yield and high purity from complex biological fluids in 3-4 h using only basic laboratory equipment, such as a conventional centrifuge capable of producing 700×g forces. Therefore, it may be used in point-of-care applications and even implemented with manually-powered centrifugation in field applications and low-resource locations. The main components of the DF cartridge can be reused after cleaning (e.g., soaking in chlorhexidine solution and then rinsing with deionized water), and only the asymmetric DF cellulose acetate membrane must be replaced before each isolation. The method may be scaled up by simultaneously processing multiple centrifuge tubes up to the capacity of a given rotor. A more significant throughput needed to harvest clinically meaningful quantities of therapeutic EVs from large volumes of growth medium is possible with purpose-designed centrifugation equipment or by using displacement or pressure-driven flows normal or tangential to the DF medium. In diagnostic and other applications where the isolation of EVs from smaller than 5 mL volumes is desirable, the DF cartridge such as that shown in FIG. 1c, can be scaled down to be compatible with 500 μl centrifuge tubes, requiring only ~50 μl of a biofluid.

While described largely in the context of isolation of extracellular vesicles (EVs), it will be appreciated that other "particles" could be similarly isolated using a similar technique. Depending on the size of the particles to be isolated, the pore size characteristics of the asymmetric depth filter media may be altered (e.g., smaller pores to capture smaller particles, larger pores to capture larger particles). Non-limiting examples of such other particles that could be captured include viruses, lipid particles (such as HDL and LDL), protein agglomerates, and therapeutic and vaccine formulations that use nanoparticles to deliver therapeutics, such as COVID or other vaccines that use liposomes to deliver mRNA. The storage of captured particles adds a delay of desired duration between the isolation and recovery of EVs (or other particles) as described herein. Depending on the required storage duration, EVs captured by DF medium may be kept in hydrated, dried, lyophilized, frozen, or other forms that prevent their degradation until recovery. It will be apparent that the DF media with the EVs or other desired captured particles can be used to deliver such particles for therapy, analysis, or any other contemplated use. The rate of the therapeutic delivery may be controlled passively by the design of the DF medium, which will determine the rate of EVs defusing out of the filtration medium to the treatment site. The delivery of EVs may also be actively controlled by applying force fields, such as ultrasound, electric field, or pressure gradient. The biocompatibility of cellulose acetate allows the delivery of EV-infused patches and bandages directly to impacted treatment areas, such as wounds. Patches of biocompatible and biodegradable DF medium infused with EVs or other therapeutic nanoparticles during their isolation may be applied to internal treatment sites for targeted delivery after surgery or minimally invasive placement inside the body.

In addition, unless otherwise indicated, numbers expressing quantities, constituents, distances, or other measurements used in the specification and claims are to be understood as optionally being modified by the term "about" or its synonyms. When the terms "about," "approximately," "substantially," or the like are used in conjunction with a stated amount, value, or condition, it may be taken to mean an amount, value or condition that deviates by less than 20%, less than 10%, less than 5%, less than 1%, less than 0.1%, or less than 0.01% of the stated amount, value, or condition.

As used herein, the term "between" includes any referenced endpoints. For example, "between 2 and 10" includes both 2 and 10.

Disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure. Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

What is claimed is:

1. A method of isolating extracellular vesicles or nanoparticles from a fluid using an asymmetric depth filter, the method comprising:
   (a) providing a fluid including extracellular vesicles or nanoparticles;
   (b) providing an asymmetric depth filter, wherein the asymmetric depth filter has asymmetric pores where the asymmetric pores have a first width at an entry portion of the asymmetric depth filter and have a second width at an exit portion of the asymmetric depth filter, wherein the first width is greater than the second width; and
   (c) passing the fluid through the asymmetric depth filter in a forward direction, wherein the fluid is introduced into the asymmetric depth filter at the entry portion, so that components of the fluid pass through the entry portion of the asymmetric pores before advancing towards the exit portion of the asymmetric pores, wherein extracellular vesicles or nanoparticles become reversibly entrapped within the entry portion of the asymmetric pores, and any proteins or low-density lipids, the proteins and low-density lipids being similarly sized to the size of the extracellular vesicles or nanoparticles are trapped in the asymmetric depth filter;
   (d) rinsing at least a portion of the extracellular vesicles or nanoparticles reversibly entrapped within the entry portion of the asymmetric pores with a rinsing material, wherein rinsing with the rinsing material increases a purity of extracellular vesicles or nanoparticles that are recovered with a flow reversal across the asymmetric depth filter, after such rinsing.

2. The method of claim 1, wherein the asymmetric pores are tortuous.

3. The method of claim 1, wherein the rinsing material is flowed through the asymmetric depth filter in the forward direction, from an entry surface to an exit surface.

4. The method of claim 1, wherein the similarly sized low-density lipids or proteins comprise at least one of a low density lipoprotein, a very-low density lipoprotein, or protein agglomerates.

5. The method of claim 1, wherein passing the fluid through the asymmetric depth filter is facilitated through centrifugation.

6. The method of claim 5, wherein a driving force associated with such centrifugation is less than $1000 \times g$.

7. The method of claim 1, wherein the asymmetric depth filter comprises at least one of cellulose acetate, regenerated cellulose, polyether sulfone, or aramid.

8. The method of claim 1, the method further comprising, before step (c), preparing the fluid by removing at least a portion of nanoparticles larger than desired nanoparticles from the fluid.

9. The method of claim 8, wherein such preparation includes one or more of centrifugation or conventional filtration through a filter media having pores having a size through which the extracellular vesicles or nanoparticles pass, and extracellular vesicles or nanoparticles larger than a desired size do not pass through the pores.

10. The method of claim 1, wherein the fluid comprises a biological fluid.

11. The method of claim 1, wherein the fluid comprises extracellular vesicles.

12. The method of claim 1, the method further comprising, after step (c), subjecting the asymmetric depth filter to a flow reversal, by passing a carrier fluid through the asymmetric depth filter along a reverse flow pathway, entering the asymmetric pores from the exit portion, and exiting the asymmetric pores at the entry portion, such reverse flow releasing the reversibly entrapped extracellular vesicles or nanoparticles from the asymmetric depth filter.

13. The method of claim 1, wherein the rising material comprises a buffer.

14. A method of isolating extracellular vesicles from a biological fluid using an asymmetric depth filter, the method comprising:
   (a) providing a biological fluid including extracellular vesicles;
   (b) providing an asymmetric depth filter, wherein the asymmetric depth filter has asymmetric pores where the asymmetric pores have a first width at an entry portion of the asymmetric depth filter and have a second width at an exit portion of the asymmetric depth filter, wherein the first width is greater than the second width;
   (c) passing the biological fluid through the asymmetric depth filter in a forward direction, wherein the biological fluid is introduced into the asymmetric depth filter at the entry portion, so that components of the biological fluid pass through the entry portion of the asymmetric pores before advancing towards the exit portion of the asymmetric pores, wherein extracellular vesicles become reversibly entrapped within the entry portion of the asymmetric pores; and (d) rinsing at least a portion of the extracellular vesicles reversibly entrapped withing the entry portion of the asymmetric pores with a rising material, wherein the rising material increases a purity of extracellular vesicles that are recovered with a flow reversal across the asymmetric depth filter, after such rinsing.

15. A method of isolating extracellular vesicles from a biological fluid using an asymmetric depth filter, the method comprising:

(a) providing a biological fluid including extracellular vesicles;

(b) providing an asymmetric depth filter, wherein the asymmetric depth filter has asymmetric pores where the asymmetric pores have a first width at an entry portion of the asymmetric depth filter and have a second width at an exit portion of the asymmetric depth filter, wherein the first width is greater than the second width; and (c) passing the biological fluid through the asymmetric depth filter in a forward direction, wherein the biological fluid is introduced into the asymmetric depth filter at the entry portion, so that components of the biological fluid pass through the entry portion of the asymmetric pores before advancing towards the exit portion of the asymmetric pores, wherein extracellular vesicles become reversibly entrapped within the entry portion of the asymmetric pores;

(d) subjecting the asymmetric depth filter to a flow reversal, by passing a carrier fluid through the asymmetric depth filter along a reverse flow pathway, entering the asymmetric pores from the exit portion, and exiting the asymmetric pores at the entry portion, such reverse flow releasing the reversibly entrapped extracellular vesicles from the asymmetric depth filter.

16. The method of claim 15, further comprising rinsing at least a portion of the extracellular vesicles reversibly entrapped within the entry portion of the asymmetric pores with a rinsing material, wherein rinsing with the rinsing material increases a purity of extracellular vesicles that are recovered with a flow reversal across the asymmetric depth filter, after such rinsing.

* * * * *